(12) United States Patent
Yoon et al.

(10) Patent No.: US 12,482,221 B2
(45) Date of Patent: Nov. 25, 2025

(54) ELECTRONIC DEVICE FOR OBTAINING ILLUMINANCE DATA USING IMAGE SENSOR

(71) Applicant: Samsung Electronics Co., Ltd., Suwon-si (KR)

(72) Inventors: Heewoong Yoon, Suwon-si (KR); Jeongho Cho, Suwon-si (KR); Jongah Kim, Suwon-si (KR); Jungbae Bae, Suwon-si (KR); Kihyuk Lee, Suwon-si (KR); Donghan Lee, Suwon-si (KR); Hyeoncheol Jo, Suwon-si (KR); Gwangho Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 547 days.

(21) Appl. No.: 17/954,948

(22) Filed: Sep. 28, 2022

(65) Prior Publication Data
US 2023/0177802 A1 Jun. 8, 2023

Related U.S. Application Data

(63) Continuation of application No. PCT/KR2022/013293, filed on Sep. 5, 2022.

(30) Foreign Application Priority Data

Dec. 2, 2021 (KR) .......... 10-2021-0171296
Jan. 18, 2022 (KR) .......... 10-2022-0006997

(51) Int. Cl.
G06V 10/60 (2022.01)
G06V 10/74 (2022.01)
G09G 5/00 (2006.01)

(52) U.S. Cl.
CPC ............ *G06V 10/60* (2022.01); *G06V 10/761* (2022.01); *G09G 5/00* (2013.01); *G09G 2320/0626* (2013.01)

(58) Field of Classification Search
CPC ........ G06V 10/60; G06V 10/761; G09G 5/00; G09G 5/10; G09G 2320/0626; G09G 2320/0686; G09G 2320/16
See application file for complete search history.

(56) References Cited

U.S. PATENT DOCUMENTS 9,013,613 B2    4/2015  Ogita et al.
2015/0070337 A1*  3/2015  Bell ............... G09G 3/2003
                                               345/82

(Continued)

FOREIGN PATENT DOCUMENTS

JP     2012-070356 A     4/2012
KR   10-2008-0002184 A    1/2008

(Continued)

OTHER PUBLICATIONS

International Search Report dated Dec. 12, 2022, issued in an International Patent Application No. PCT/KR2022/013293.

*Primary Examiner* — John B Strege
(74) *Attorney, Agent, or Firm* — Jefferson IP Law, LLP

(57) ABSTRACT

An electronic device is provided. The electronic device includes a window, a display, an image sensor, a first processor connected through a first electric path to the image sensor, and a second processor connected through a second electric path different from the first electric path to the image sensor.

20 Claims, 13 Drawing Sheets

(56) References Cited

U.S. PATENT DOCUMENTS

| | | | | |
|---|---|---|---|---|
| 2016/0034019 | A1* | 2/2016 | Seo | H04N 5/63 |
| | | | | 345/593 |
| 2017/0229059 | A1* | 8/2017 | Bonnier | G06F 3/017 |
| 2018/0348049 | A1* | 12/2018 | Yoon | G09G 3/3406 |
| 2018/0373380 | A1* | 12/2018 | Wang | A61B 5/0077 |
| 2020/0279526 | A1 | 9/2020 | Jang et al. | |
| 2021/0327394 | A1* | 10/2021 | Bui | G06F 3/012 |
| 2023/0087988 | A1* | 3/2023 | He | G09G 3/20 |
| | | | | 345/77 |

FOREIGN PATENT DOCUMENTS

| | | |
|---|---|---|
| KR | 10-2008-0073951 A | 8/2008 |
| KR | 10-2011-0068537 A | 6/2011 |
| KR | 10-2015-0053189 A | 5/2015 |
| KR | 10-1598533 B1 | 2/2016 |
| KR | 10-2017-0142813 A | 12/2017 |
| KR | 10-2018-0024526 A | 3/2018 |
| KR | 10-2018-0031288 A | 3/2018 |
| KR | 10-2135560 B1 | 7/2020 |

* cited by examiner

ELECTRONIC DEVICE FOR OBTAINING ILLUMINANCE DATA USING IMAGE SENSOR

CROSS-REFERENCE TO RELATED APPLICATION(S)

This application is a continuation application, claiming priority under § 365(c), of an International application No. PCT/KR2022/013293, filed on Sep. 5, 2022, which is based on and claims the benefit of a Korean patent application number 10-2021-0171296, filed on Dec. 2, 2021, in the Korean Intellectual Property Office, and of a Korean patent application number 10-2022-0006997, filed on Jan. 18, 2022, in the Korean Intellectual Property Office, the disclosure of each of which is incorporated by reference herein in its entirety.

TECHNICAL FIELD

The disclosure relates to an electronic device for obtaining illuminance data using an image sensor.

BACKGROUND ART

In order to enhance a quality of services provided from the electronic device, the electronic device may obtain information on an environment in which the electronic device is located or an environment around the electronic device. For example, the electronic device may identify brightness around the electronic device by using a sensor in the electronic device.

DISCLOSURE

Technical Solution

In accordance with an aspect of the disclosure, an electronic device is provided. The electronic device includes a window, a display, disposed under the window, comprising a plurality of pixels, the plurality of pixels comprising first pixels, an image sensor disposed under the display, a first processor connected through a first electric path to the image sensor, and a second processor connected through a second electric path different from the first electric path to the image sensor, wherein the second processor may be configured to, while displaying a screen through the display controlled by the first processor, obtain first illuminance data via a first pixels of the image sensor disposed under the first pixels of the display among a plurality of pixels of the image sensor, and obtain second illuminance data via a second pixels of the image sensor disposed under wires for driving the first pixels of the display among the plurality of pixels of the image sensor, the second pixels of the image sensor surrounding the first pixels of the image sensor, and obtain data regarding brightness around the electronic device, based on the first illuminance data and the second illuminance data.

In accordance with another aspect of the disclosure, an electronic device is provided. The electronic device includes a window, a display, disposed under the window, comprising a plurality of pixels, the plurality of pixels comprising first pixels, an image sensor disposed under the display, a first processor connected through a first electric path to the image sensor, and a second processor connected through a second electric path different from the first electric path to the image sensor, wherein the second processor may be configured to, while the first processor is in a second state among a first state obtaining an image based on data obtained via the image sensor and the second state distinct from the first state, obtain first illuminance values via first pixels of the image sensor located in an area comprising the first pixels of the display when viewed from above, among a plurality of pixels of the image sensor, and obtain second illuminance values via second pixels of the image sensor located along a periphery of the area when viewed from above, among the plurality of pixels of the image sensor, and obtain data regarding brightness around the electronic device, based on the first illuminance values and the second illuminance values.

In accordance with another aspect of the disclosure, an electronic device is provided. The electronic device includes a window, a display, disposed under the window, comprising a plurality of pixels, the plurality of pixels comprising first pixels, an image sensor disposed under the display, and at least one processor, wherein the at least one processor may be configured to, while display a white image through the display in a state in which a periphery of the electronic device is black, obtain first illuminance values via first pixels of the image sensor included in a specified area comprising the first pixels of the display when viewed from above, and obtain second illuminance values via second pixels of the image sensor surrounding the specified area, wherein the second pixels of the image sensor overlaps at least portion of wires for operating the first pixels of the display when viewed from above, and obtain a reference value used for identifying brightness around the electronic device based on the first illuminance values and the second illuminance values.

DESCRIPTION OF THE DRAWINGS

The above and other aspects, features, and advantages of certain embodiments of the disclosure will be more apparent from the following description taken in conjunction with the accompanying drawings, in which.

MODE FOR INVENTION

Figure 1:
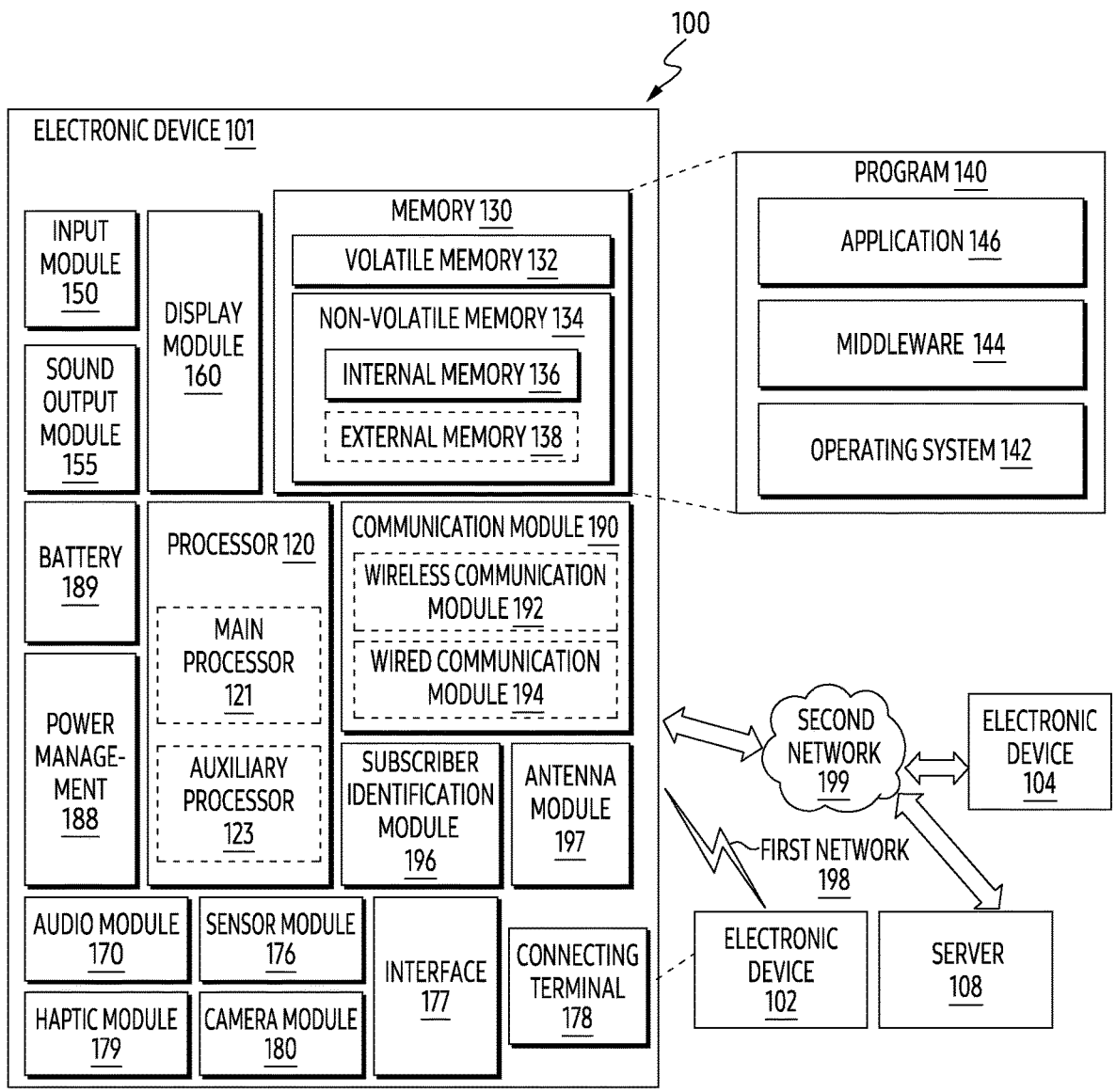
FIG. 1 is a block diagram of an electronic device in a network environment according to an embodiment of the disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)). According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

An electronic device having portability may include a display. In order to expand a size of a display area of the display, a bezel area surrounding the display area may have a decreased width. Due to the decrease in the width of the bezel area, the image sensor in the electronic device used to take a selfie may be disposed under the display area instead of under the bezel area.

Meanwhile, lights received by the image sensor disposed under the display area may include not only a light from the outside but also an emitted light from the display area.

Accordingly, in order to obtain data on brightness around the electronic device by using the image sensor, a method for reducing an influence of light emission in the display area may be required in the electronic device.

Figure 2:
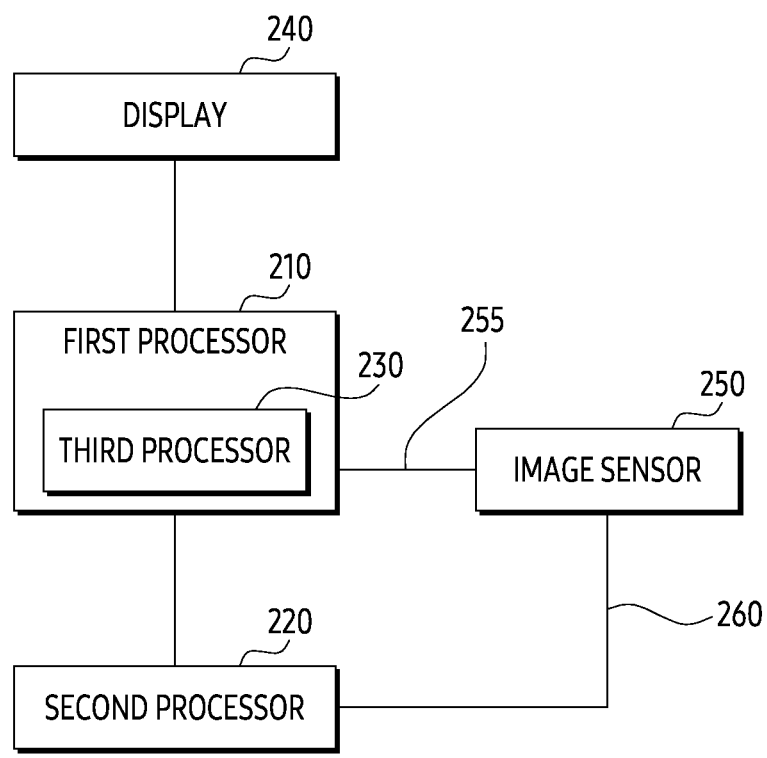
FIG. 2 is a simplified block diagram illustrating an electronic device according to an embodiment of the disclosure.

FIG. 2 is a simplified block diagram illustrating an electronic device according to an embodiment of the disclosure. A functional configuration of the electronic device illustrated by the simplified block diagram may be included in the electronic device 101 illustrated in FIG. 1.

Referring to FIG. 2, an electronic device 101 may include a first processor 210, a second processor 220, a display 240, and an image sensor 250.

In an embodiment, the first processor 210 may include the main processor 121 illustrated in FIG. 1. For example, the first processor 210 may be referred to as an application processor.

In an embodiment, the first processor 210 may be operatively coupled to the second processor 220, the display 240, and the image sensor 250. For example, the first processor 210 may be connected to the image sensor 250 through a first electrical path 255. For example, the first electrical path 255 may include a mobile industry processor interface (MIPI). However, it is not limited thereto.

In an embodiment, the first processor 210 may further include a third processor 230 configured to obtain an image based on data (e.g., raw data) obtained through the image sensor 250. For example, the third processor 230 may be referred to as an image signal processor (ISP) or an image sensor. Although FIG. 2 illustrates an example in which the third processor 230 is included in the first processor 210, the third processor 230 may be located outside the first processor 210. For example, the third processor 230 located outside the first processor 210 may be operatively coupled to the first processor 210 and operatively coupled to the image sensor 250. For example, the third processor 230 located outside the first processor 210 may be connected to the image sensor 250 through the first electrical path 255. However, it is not limited thereto.

In an embodiment, the second processor 220 may include the auxiliary processor 123 illustrated in FIG. 1. For example, the second processor 220 may include a sensor hub processor.

In an embodiment, the second processor 220 may be operatively coupled to the first processor 210 and the image sensor 250. For example, the second processor 220 may be connected to the image sensor 250 through a second electrical path 260. For example, the second electrical path 260 may include an MIPI, an inter-integrated circuit (I2C), or a serial peripheral interface (SPI). However, it is not limited thereto.

In an embodiment, the second processor 220 may be configured to obtain illuminance data through the image sensor 250. For example, the illuminance data may include illuminance values indicating how much light reaches a surface. For example, the illuminance data may mean a luminous flux per unit area. For example, the second processor 220 may obtain the illuminance data through a plurality of pixels in the image sensor 250. For example, the second processor 220 may obtain the illuminance data based on raw data obtained through the image sensor 250 without processing (e.g., Bayer transformation, Demosaicing, noise reduction, and/or image sharpening) for obtaining an image executed by the first processor 210 or the third processor 230.

In an embodiment, the second processor 220 may consume substantially lower power than the first processor 210. For example, the power consumed by the second processor 220 to obtain the illuminance data based on the row data obtained through the image sensor 250 may be less than the power consumed by the first processor 210 to obtain the illuminance data based on the row data obtained through the image sensor 250. For example, in order to reduce power consumption due to obtainment of the illuminance data, the electronic device 101 may obtain illuminance data using the second processor 220 from among the first processor 210 and the second processor 220.

In an embodiment, the display 240 may include the display module 160 illustrated in FIG. 1. In an embodiment, the display 240 may include an edge display including a planar portion and at least one curved portion extending from the planar portion, a foldable display, or a rollable display.

In an embodiment, the image sensor 250 may include the camera module 180 illustrated in FIG. 1. In an embodiment, the image sensor 250 may be disposed in a direction corresponding to the direction in which the display 240 faces. In an embodiment, the image sensor 250 may be used to take a selfie. For example, the image sensor 250 may provide raw data to the first processor 210 or the third processor 230 through the first electrical path 255 to obtain an image such as a selfie. In an embodiment, the image sensor 250 may be used to obtain illuminance data. For example, the image sensor 250 may provide raw data to the second processor 220 through the second electrical path 260 to obtain the illuminance data.

In an embodiment, while the image sensor 250 provides row data to the first processor 210 or the third processor 230 through the first electrical path 255, the image sensor 250 may not provide row data to the second processor 220 through the second electrical path 260. In an embodiment, while the image sensor 250 provides raw data to the second processor 220 through the second electrical path 260, the image sensor 250 may not provide raw data to the first processor 210 or the third processor 230 through the first electrical path 255.

In an embodiment, the image sensor 250 may be disposed under the display 240. For example, the image sensor 250 may be disposed under the display area of the display 240 rather than under the bezel area surrounding the display 240 when viewed from above.

Figure 3:
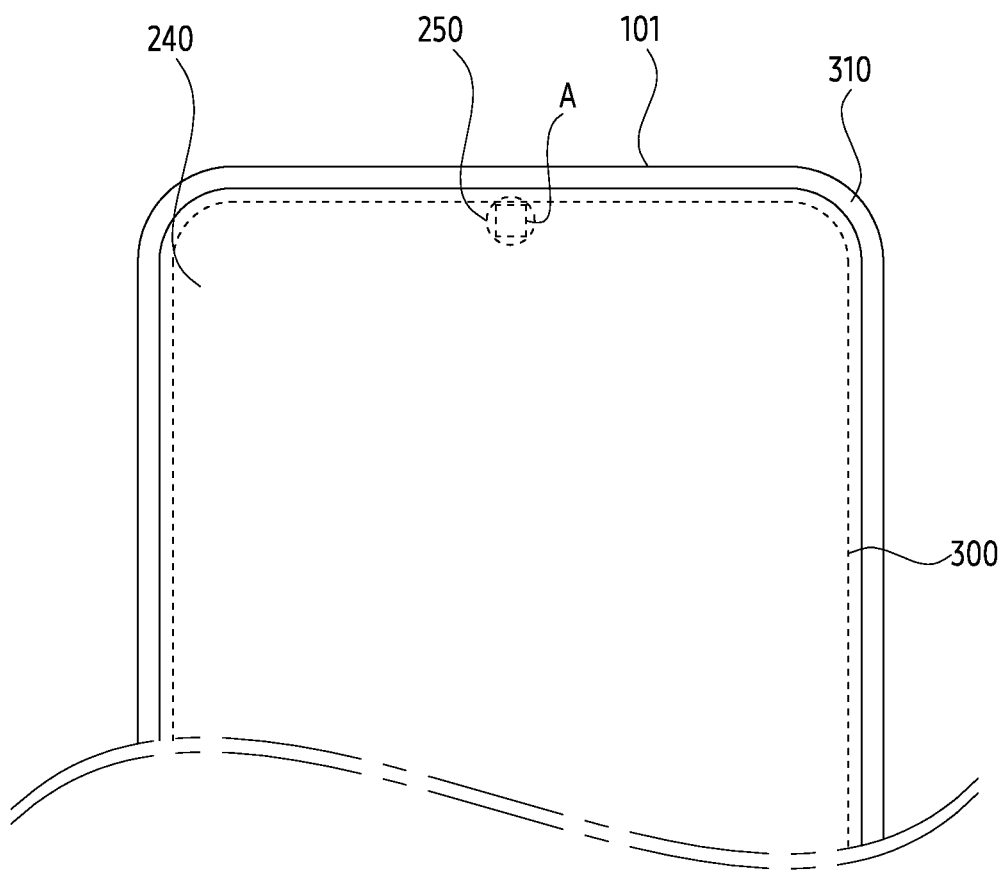
FIG. 3 is a top plan view illustrating an electronic device according to an embodiment of the disclosure.
Figure 4:
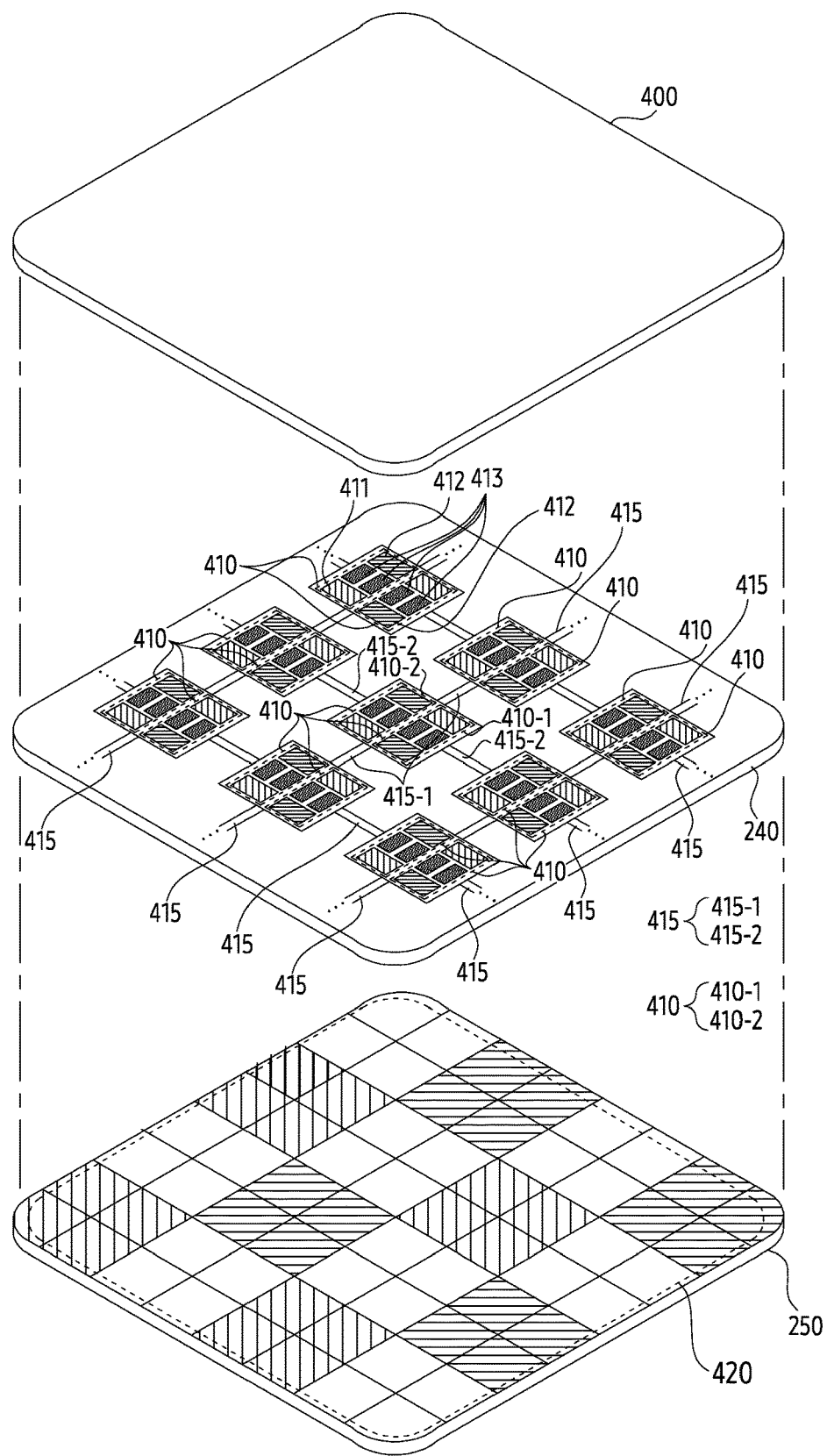
FIG. 4 is a partially exploded perspective view illustrating an electronic device according to an embodiment of the disclosure.

For example, referring to FIG. 3, which is a top plan view illustrating an electronic device according to an embodiment, the electronic device 101 may include the display 240 and the image sensor 250 disposed under the display area 300 of the display 240. For example, the image sensor 250 may be disposed under the display area 300 rather than under the bezel area 310 surrounding the display 240 when viewed from above. For example, the image sensor 250 may be disposed under at least portion of pixels of the display 240 and wires disposed to drive the pixels. For example, pixels and wires of the display 240 may be positioned on the image sensor 250. For example, the image sensor 250 disposed under the display 240 may be referred to as an under display camera (UDC). For example, referring to FIG. 4, which is a partially exploded perspective view illustrating an electronic device according to an embodiment of the disclosure, within area A of FIG. 3, the display 240 may be disposed under a window 400, and the image sensor 250 may be disposed under the display 240.

In an embodiment, the window 400 may be disposed on the display 240 to protect the display 240. For example, the window 400 may include at least one of polyimide (PI), polyethylene (PET), polyurethane (PU), cellulose triacetate (TAC), and ultra-thin glass (UTG). However, it is not limited thereto.

In an embodiment, the display 240 may include a plurality of pixels 410 that emit light toward the window 400. For example, each of the plurality of pixels 410 may include a sub-pixel 411 configured to emit red light, a sub-pixel 412 configured to emit blue light, and sub-pixels 413 configured to emit green light. For example, the sub-pixels 413 may be disposed between the sub-pixel 411 and the sub-pixel 412.

In an embodiment, a portion of the plurality of pixels 410 may form a pair or an array with other portion of the plurality of pixels 410. For example, a first pixel 410-1 among the plurality of pixels 410 and a second pixel 410-2 among the plurality of pixels 410 may be disposed in a pair. For example, the sub-pixel 411 in the first pixel 410-1 may be adjacent to the sub-pixel 412 in the second pixel 410-2, and the sub-pixel 412 in the first pixel 410-1 may be adjacent to the sub-pixel 411 in the second pixel 410-2. For example, the sub-pixels 413 in the first pixel 410-1 may be adjacent to the sub-pixels 413 in the second pixel 410-2. However, it is not limited thereto.

In an embodiment, the display 240 may include a plurality of wires 415 for driving the plurality of pixels 410.

In an embodiment, the image sensor 250 may include a plurality of pixels 420. For example, each of the plurality of pixels 420 may include a micro-lens, a color filter, and/or a plurality of photodiodes. For example, the color filter may pass through light of a specified color. For example, the color filter may include a red filter passing through red light, a green filter passing through green light, a blue filter passing through blue light, and/or a white filter passing through white light. For example, the color filter may form a Bayer pattern. However, it is not limited thereto. In an embodiment, each of the plurality of pixels 420 may further include an infrared blocking filter for blocking infrared rays from light incident through the micro-lens and/or an anti-reflection film for reducing reflection of light incident through the micro-lens to the outside. However, it is not limited thereto.

In an embodiment, the plurality of pixels 410 of the display 240 may emit light toward the window 400 to display a screen (or image) through the display 240. For example, a portion of light emitted toward the window 400 through each of the plurality of pixels 410 of the display 240 may be reflected by the window 400. For example, the portion of the light reflected by the window 400 may not reach pixels of the image sensor 250 disposed under the plurality of pixels 410 of the display 240 among the plurality of pixels 420 of the image sensor 250. For example, the portion of the light reflected by the window 400 may or may not reach the image sensor 250 depending on whether each of the plurality of wires 415 of the display 240 is located in the path of the portion of the light. For example, since the transmittance of light of each of the plurality of wires 415 of the display 240 may be 0% (percentage), the portion of the light may not reach pixels of the image sensor 250 disposed under each of the plurality of wires 415 of the display 240 among the plurality of pixels 420 of the image sensor 250.

Figure 5:
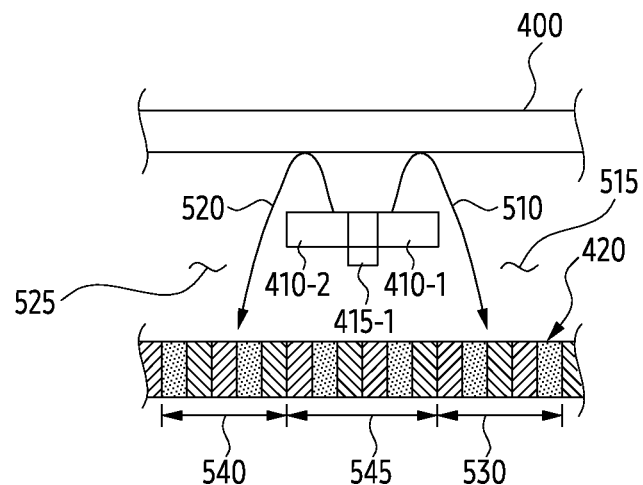
FIG. 5 illustrates various paths of light emitted from a display disposed on an image sensor of an electronic device according to an embodiment of the disclosure.
Figure 5:
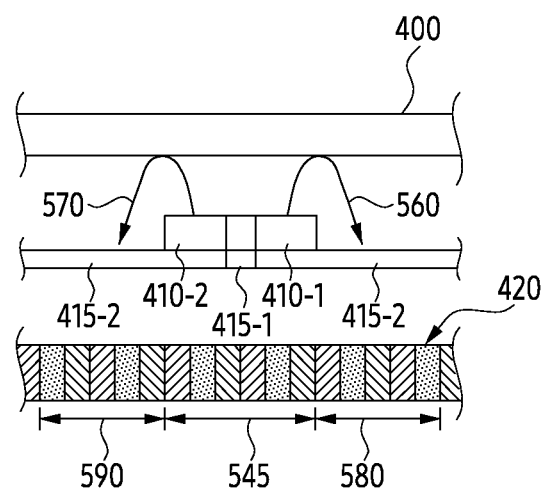

For example, referring to FIG. 5 illustrating exemplary paths of light emitted from a display disposed on an image sensor of an electronic device according to an embodiment, the first pixel 410-1 of the display 240 among the plurality of pixels 410 of the display 240 may emit a first light 510 toward the window 400 and the second pixel 410-2 of the display 240 among the plurality of pixels 410 of the display 240 may emit a second light 520 toward the window 400.

For example, the first pixel 410-1 of the display 240 and the second pixel 410-2 of the display 240 may emit the first light 510 and the second light 520, respectively, based on at least portion of signals provided through the wires 415-1 among the plurality of wires 415. For example, a portion of the first light 510 may be reflected by the window 400, and the portion of the first light 510 reflected by the window 400 may reach at least a portion of the pixels 530 (pixels in the first group) of the image sensor 250 among the plurality of pixels 420 of the image sensor 250 through a space 515 in which the plurality of wires 415 are not disposed; and wherein a portion of the second light 520 may be reflected by the window 400, and the portion of the second light 520 reflected by the window 400 may reach at least a portion of the pixels 540 (pixels in the second group) of the image sensor 250 among the plurality of pixels 420 of the image sensor 250 through a space 525 in which the plurality of wires 415 are not disposed. Meanwhile, the portion of the first light 510 and the portion of the second light 520 may not reach at least a portion of pixels 545 (pixels in the third group) of the image sensor 250 disposed under the first pixel 410-1 of the display 240 and the second pixel 410-2 of the display 240 among the plurality of pixels 420 of the image sensor 250. For example, an average of illuminance values obtained through the pixels 545 (pixels in the third group) of the image sensor 250 may be lower than an average of illuminance values obtained through the pixels 530 (pixels in the first group) of the image sensor 250, and an average of illuminance values obtained through the pixels 545 (pixels in the third group) of the image sensor 250 may be lower than an average of illuminance values obtained through the pixels 540 (pixels in the second group) of the image sensor 250.

For another example, the first pixel 410-1 of the display 240 may emit a third light 560 different from the first light 510 toward the window 400, and the second pixel 410-2 of the display 240 may emit a fourth light 570 different from the second light 520 toward the window 400. For example, the first pixel 410-1 of the display 240 and the second pixel 410-2 of the display 240 may emit the third light 560 and the fourth light 570, respectively, based on a signal provided through the wire 415-1 among the plurality of wires and a signal provided through the wire 415-2 among the plurality of wires. For example, a portion of the third light 560 may be reflected by the window 400, and the portion of the third light 560 reflected by the window 400 may not reach at least a portion of the pixels 580 (pixels of the fourth group) of the image sensor 250 disposed under the wire 415-2 among the plurality of pixels 420 of the image sensor 250. For example, a portion of the fourth light 570 may be reflected by the window 400, and the portion of the fourth light 570 reflected by the window 400 may not reach at least a portion of the pixels 590 (pixels in the fifth group) of the image sensor 250 disposed under the wire 415-2 among the plurality of pixels 420 of the image sensor 250. Meanwhile, the portion of the third light 560 and the portion of the fourth light 570 may not reach at least a portion of pixels 545 (pixels of the third group) of the image sensor 250 disposed under the first pixel 410-1 of the display 240 and the second pixel 410-2 among the plurality of pixels 420 of the image sensor 250. For example, an average of illumination values obtained through the pixels 580 (pixels in the fourth group) of the image sensor 250 may be lower than an average of illumination values obtained through the pixels 530 (pixels in the first group), and an average of illuminance values obtained through the pixels 590 (pixels in the fifth group) of the image sensor 250 may be lower than an average of illuminance values obtained through the pixels 540 (pixels in the second group) of the image sensor 250. Meanwhile, since each of the width of the first pixel 410-1 and the width of the second pixel 410-2 are wider than the width of the wire 415-2, an average of illuminance values obtained through the pixels 545 (pixels in the third group) of the image sensor 250 may be lower than an average of illuminance values obtained through the pixels 580 (pixels in the fourth group) of the image sensor 250, and an average of illuminance values obtained through the pixels 545 (pixels in the third group) of the image sensor 250 may be lower than an average of illuminance values obtained through the pixels 590 (pixels in the fifth group) of the image sensor 250.

Figure 6:
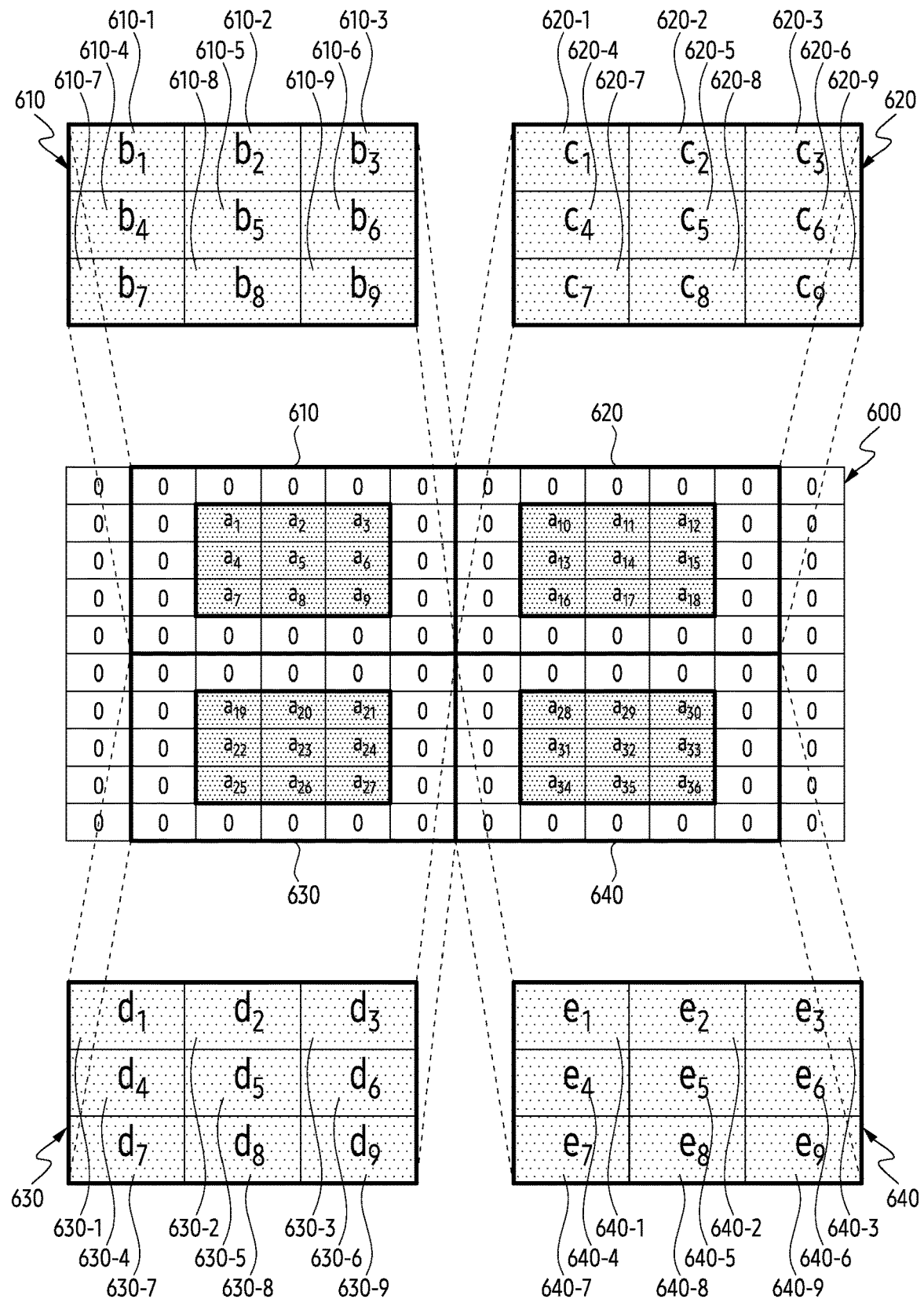
FIG. 6 illustrates illuminance data obtained through an image sensor disposed under a display of an electronic device according to an embodiment of the disclosure.

As described above, with respect to light emitted through each of the plurality of pixels 410 of the display 240, since illuminance data (e.g., illuminance values) obtained through each of the plurality of pixels 420 of the image sensor 250 may vary according to a position of each of the plurality of pixels 420 of the image sensor 250, pixels of the image sensor 250 used to identify brightness around the electronic device 101 among a plurality of pixels 420 of the image sensor 250 may be identified based on the illuminance data. For example, the pixels of the image sensor 250 may include first pixels of the image sensor 250 positioned under the first pixels of the display 240, and second pixels of the image sensor 250 that surrounds the first pixels of the image sensor 250, and are disposed under wires for driving the first pixels of the display 240. For example, the first pixels of the image sensor 250 (e.g., pixels 545 of the image sensor 250) and the second pixels of the image sensor 250 (e.g., pixels 580 of the image sensor 250 and pixels 590 of the image sensor 250) may be identified based on the illuminance data. For example, referring to FIG. 6 illustrating illumination data obtained through an image sensor disposed under a display of an electronic device according to an embodiment of the disclosure, while the plurality of pixels 410 of the display 240 emit light in a state in which the periphery of the electronic device 101 is black (e.g., 0 lux), the second processor 220 may obtain illuminance data 600 through the image sensor 250 disposed under the display 240. For example, the second processor 220 may identify that at least a portion of the first pixels (e.g., pixels 545 of the image sensor 250) of the image sensor 250 disposed under the plurality of pixels 410 of the display 240 and at least a portion of the second pixels (e.g., pixels 580 of the image sensor 250 and pixels 590 of the image sensor 250) of the image sensor 250 disposed under the plurality of wires 415 among the plurality of pixels 420 of the image sensor 250 are located within an area in which illuminance values of '0 (zero)' among the plurality of illuminance values in the illuminance data 600 are located. For example, the second processor 220 may identify that at least a portion of the pixels of the image sensor 250 (e.g., pixels 530 of the image sensor 250 (pixels of the first group) and pixels 540 of the image sensor 250 (pixels of the second group)), which is not disposed under the plurality of pixels 410 of the display 240 and is not disposed under the plurality of wires 415 of the display 240 among the plurality of pixels 420 of the image sensor 250, are located within an area in which illumination values of $a_1$ to $a_{36}$ among the plurality of illumination values in the illumination data 600 are located. For example, the illuminance values of $a_1$ to $a_{36}$ may be greater than '0 (zero).

In an embodiment, the position of pixels (e.g., first pixels and second pixels) of the image sensor 250 used to identify brightness around the electronic device 101 among the plurality of pixels 420 of the image sensor 250 may be identified based on illuminance data 600 illuminance data 600 when the electronic device 101 is initialized. For example, in manufacturing process, or in initialization setup mode, the electronic device 101 may identify an area (e.g., an area defined by first pixels) in which illuminance values of "0 (zero)" among a plurality of illuminance values in the illuminance data 600 are located, and an area (e.g., an area defined by second pixels) in which illuminance values greater than '0 (zero)' among a plurality of illuminance values in the illuminance data 600 are located. For example, the illuminance value used to identify the positions of pixels of the image sensor 250 may include a value substantially close to 'zero'. For example, the illuminance value may include 1 (one) or 2 (two). Meanwhile, since the plurality of pixels 410 of the display 240 are disposed as a grid pattern, illuminance values of '0' in the illuminance data 600 obtained through the image sensor 250 may also be distributed to form the grid pattern. The distribution of illuminance values of '0' may be used to identify the first pixels of the image sensor 250 and the second pixels of the image sensor 250. For example, the second processor 220 may identify the first virtual area 610, the second virtual area 620, the third virtual area 630, and the fourth virtual area 640 based on the distribution of illumination values of '0' in the illumination data 600. The second processor 220 may divide each of the first virtual area 610, the second virtual area 620, the third virtual area 630, and the fourth virtual area 640 into a plurality of sub-virtual areas, and identify representative values of each of the plurality of sub-virtual areas based on illuminance values of each of the first virtual area 610, the second virtual area 620, the third virtual area 630, and the fourth virtual area 640. For example, the second processor 220 may divide the first virtual area 610 into sub-virtual areas of the first group including the first sub-virtual area 610-1 to the ninth sub-virtual area 610-9, and identify representative values ($b_1$ to $b_9$) indicating the first sub-virtual area 610-1 to the ninth sub-virtual area 610-9 in the first group, respectively, based on illuminance values in the first virtual area 610. For example, the second processor 220 may divide the second virtual area 620 into sub-virtual areas of the second group including the first sub-virtual area 620-1 to the ninth sub-virtual area 620-9, and identify representative values ($c_1$ to $c_9$) indicating the first sub-virtual area 620-1 to the ninth sub-virtual area 620-9 in the second group, respectively, based on illuminance values in the second virtual area 620. For example, the third processor 230 may divide the third virtual area 630 into sub-virtual areas of the third group including the first sub-virtual area 630-1 to the ninth sub-virtual area 630-9, and identify representative values ($d_1$ to $d_9$) indicating the first sub-virtual area 630-1 to the ninth sub-virtual area 630-9 in the third group, respectively, based on illuminance values in the third virtual area 630. For example, the third processor 230 may divide the fourth virtual area 640 into sub-virtual areas of the fourth group including the first sub-virtual area 640-1 to the ninth sub-virtual area 640-9, and identify representative values ($e_1$ to $e_9$) indicating the first sub-virtual area 640-1 to the ninth sub-virtual area 640-9 in the fourth group, respectively, based on illuminance values in the fourth virtual area 640.

Figure 7:
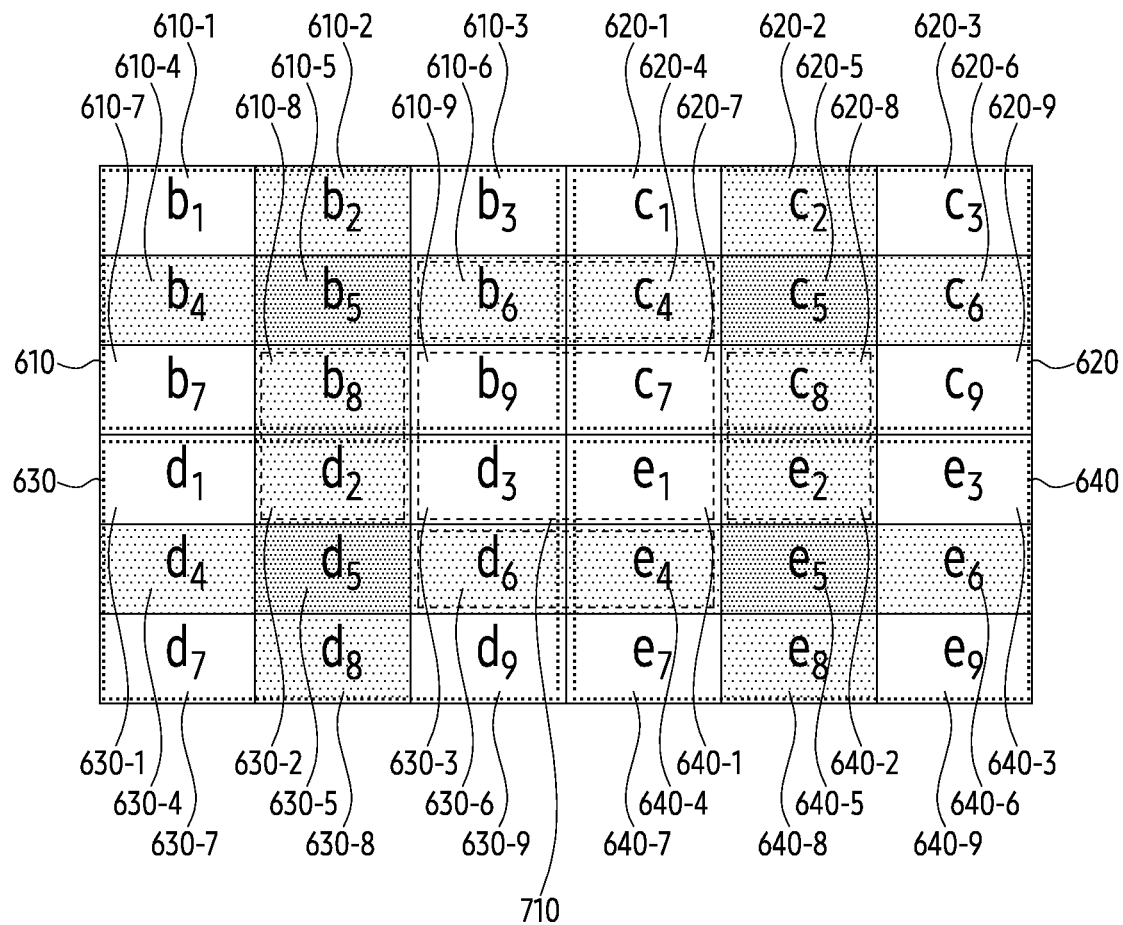
FIG. 7 illustrates first illuminance data and second illuminance data obtained through an image sensor disposed under a display of an electronic device according to an embodiment of the disclosure.

In an embodiment, a second processor 220 may identify first pixels (e.g., pixels 545 of an image sensor 250) of an image sensor 250 and second pixels (e.g., pixels 580 of image sensor 250 and pixels 590 of image sensor 250) based on the representative values of each of the plurality of sub-virtual areas. For example, the second processor 220 may identify representative values ($b_1$, $b_3$, $b_7$, and $b_9$) that are less than the first reference value among the representative values ($b_1$ to $b_9$) indicating the first sub-virtual area 610-1 to the ninth sub-virtual area 610-9 dividing the first virtual area 610 respectively, identify representative values ($b_2$, $b_4$, $b_6$, and $b_8$) of the representative values ($b_1$ to $b_9$) that are greater than or equal to the first reference value and less than or equal to the second reference value, and identify a representative value ($b_5$) equal to or greater than the second reference value among the representative values ($b_1$ to $b_9$). The second processor 220 may also classify representative values indicating the plurality of sub-virtual areas in each of the second virtual area 620 to the fourth virtual area 640 based on the first reference value and the second reference value. Based on the classification, the second processor 220 may identify the first pixels (e.g., pixels 545 of the image sensor 250) and the second pixels (e.g., pixels 580 of the image sensor 250 and pixels 590 of the image sensor 250) of the image sensor 250 used to identify brightness around the electronic device 101. For example, referring to FIG. 7 illustrating first illuminance data and second illuminance data obtained through an image sensor disposed under a display of an electronic device according to an embodiment, based on the distribution of sub-virtual areas with representative values ($b_1$, $b_3$, $b_7$, $b_9$, $c_1$, $c_3$, $c_7$, $c_9$, $d_1$, $d_3$, $d_7$, $d_9$, $e_1$, $e_3$, $e_7$, and $e_9$) less than the first reference value, The second processor 220 may identify that pixels (e.g., pixels 545 of the image sensor 250) of the image sensor 250 positioned under the first pixels of the display 240 are located in the area 710 including representative values ($b_9$, $c_7$, $d_3$, and $e_1$), and identify pixels of the image sensor 250 located in the area 710 as the first pixels of the image sensor 250 used to identify brightness around the electronic device 101. The second processor 220 may identify pixels of the image sensor 250 in a sixth sub-virtual area 610-6 in the first group with representative values ($b_6$, $b_8$, $c_4$, $c_8$, $d_2$, $d_6$, $e_2$, and $e_4$) greater than or equal to the first reference value and less than the second reference value respectively, an eighth sub-virtual area 610-8 in the first group, an fourth sub-virtual area 620-4 in the second group, an eighth sub-virtual area 620-8 in the second group, a second sub-virtual area 630-2 in the third group, a sixth sub-virtual area 630-6 in the third group, a second sub-virtual area 640-2 in the fourth group, and a fourth sub-virtual area 640-4 in the fourth group, from among the sub-virtual areas surrounding the area 710, as second pixels of the image sensor 250 used to identify brightness around the electronic device 101.

In an embodiment, the second processor 220 may obtain data on brightness around the electronic device 101 based on the first illuminance data including first illuminance values obtained through the first pixels of the image sensor 250 and the second illuminance data including second illuminance values obtained through the second pixels of the image sensor 250. For example, since the first illuminance data is obtained through the first pixels of the image sensor 250 disposed under the first pixels of the display 240 and the second illuminance data is obtained through the second pixels of the image sensor 250 disposed under wires for surrounding the first pixels of the image sensor 250 and driving the first pixels of the display 240, the first illuminance data and the second illuminance data may be data in which an influence of light emission of a plurality of pixels 410 of the display 240 is reduced. For example, since the first illumination data and the second illumination data represent light around the electronic device 101 or light illumination from the outside of the electronic device 101, the second processor 220 may obtain data on brightness around the electronic device 101 based on the first illumination data and the second illumination data.

In an embodiment, the second processor 220 may obtain the data on the brightness based on a difference between the first illuminance data and the second illuminance data. For example, the second processor 220 may identify a difference between the first illuminance data and the second illuminance data in order to reduce the influence of light emission of the plurality of pixels 410 of the display 240, and obtain the data on the brightness based on the identified difference. For example, since identifying a difference between the first illumination data and the second illumination data means that a component of light emitted from the plurality of pixels 410 of the display 240 included in the first illumination values in the first illuminance data, and a component of the light emitted from the plurality of pixels 410 of the display 240 included in the second illumination values in the second illumination data are reduced, the second processor 220 may obtain data on the brightness based on the difference between the first illuminance data and the second illuminance data.

In an embodiment, the second processor 220 may obtain the data on the brightness based further on the reference data. For example, the reference data may be obtained before the electronic device 101 is supplied to the user after completion of assembly of the electronic device 101. For another example, the reference data may be obtained on a condition that the display 240 and/or the image sensor 250 is newly replaced or newly inserted into the electronic device 101. For example, the replacement of display 240 and/or image sensor 250 or the insertion of display 240 and/or image sensor 250 may be identified by changing the identifier of the display 240 and/or the identifier of the image sensor 250 stored in the memory of the electronic device 101 (e.g., the non-volatile memory 134 illustrated in FIG. 1). As another example, the reference data may be obtained on conditions of detecting a specified event or receiving a specified input. For example, the specified event or the specified input may be caused on a condition that the data on the brightness does not reflect the brightness around the electronic device 101. However, it is not limited thereto.

For example, the reference data may be obtained after identifying the first pixels of the image sensor 250 and identifying the second pixels of the image sensor 250. For example, the second processor 220 may obtain the third illuminance data through the first pixels of the image sensor 250 while displaying a white image through the display 240 in a state in which the periphery of the electronic device 101 is black (e.g., 0 lux), and obtain the fourth illuminance data through the second pixels of the image sensor 250 while displaying the white image within the state. The second processor 220 may obtain a difference between the third illuminance data and the fourth illuminance data as the reference data. For example, the reference data may indicate a difference between the third illuminance data and the fourth illuminance data. However, it is not limited thereto.

In an embodiment, the second processor 220 may obtain the data on the brightness further based on the degree (e.g., the transmittance of the display 240) to which light outside the electronic device 101 passes through the display 240. For example, the second processor 220 may obtain the data on the brightness by applying the degree to the data illustrating the brightness around the electronic device 101 obtained based on the first illuminance data, the second illuminance data, and the reference data. For example, the second processor 220 may obtain the data on the brightness to which the characteristic of the display 240 is reflected (or applied).

In an embodiment, the second processor 220 may obtain the data on the brightness further based on a dark count of the image sensor 250. For example, the second processor 220 may obtain the data on the brightness in order to reflect or apply the characteristics of the image sensor 250 to the data on the brightness further based on the dark count, which is a coefficient of the electrical signal output from the image sensor 250 in the absence of light.

In an embodiment, the second processor 220 may obtain the data on the brightness using Equation 1 below.

$$Lux = C_{Gain}(X_{amb} - C_{Dark}) + C_B \qquad \text{Equation 1}$$

In Equation 1, $X_{amb}$ represent a difference between the first illuminance data and the second illuminance data, $C_{Dark}$ represents the reference data, $C_{Gain}$ represents the degree to which light outside the electronic device 101 passes through the display 240, $C_B$ represents the dark count of the image sensor 250, and Lux represents the brightness around the electronic device 101.

In an embodiment, the second processor 220 may provide the data on the brightness to the first processor 210. For example, the second processor 220 may provide the data on the brightness to the first processor 210 in response to obtaining the data on the brightness. For another example, the second processor 220 may provide the data on the brightness to the first processor 210 in response to obtaining the data on the brightness and identifying that the data on the brightness satisfies a specified condition. However, it is not limited thereto.

The data on the brightness provided to the first processor 210 may be variously utilized. For example, the first processor 210 may change the brightness of the screen displayed through the display 240 based on the data on the brightness. However, it is not limited thereto.

As described above, the electronic device 101 may obtain the data on the brightness by using the image sensor 250 without a separate sensor (e.g., an illumination sensor) for identifying the brightness around the electronic device 101. Since the first pixels of the image sensor 250 disposed under the first pixels of the display 240, and the second pixels of the image sensor 250 located along the edge of the area including the first pixels of the display 240 when viewed from above are identified, the electronic device 101 may compensate for a deviation (or tolerance) caused when the display 240 and the image sensor 250 are assembled, based on the illumination data obtained through the image sensor 250. Meanwhile, since the data on brightness is obtained based on the first illuminance data obtained through the first pixels of the image sensor 250 and the second illuminance data obtained through the second pixels of the image sensor 250, the electronic device 101 may obtain the data on the brightness in which the influence of light emission of the plurality of the pixels 410 of the display 240 is reduced, although the image sensor 250 disposed under the display 240 is used. In an embodiment, since the data on the brightness is obtained further based on the reference data obtained in a state in which the periphery of the electronic device 101 is completely black, the electronic device 101 may obtain the data on the brightness in which the influence of light emission of the plurality of the pixels 410 of the display 240 is reduced, although the image sensor 250 disposed under the display 240 is used. In an embodiment, since the data on the brightness is obtained further based on a characteristic of the display 240 and a characteristic of the image sensor 250, the electronic device 101 may obtain the data on the brightness for which the characteristic of the display 240 and the image sensor 250 that may be different for each product are compensated.

Figure 8:
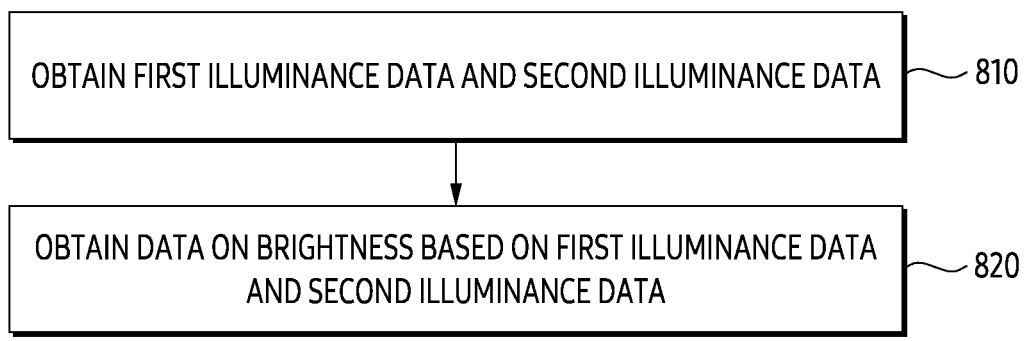
FIG. 8 is a flowchart illustrating a method of obtaining data on brightness around an electronic device, according to an embodiment of the disclosure.

FIG. 8 is a flowchart illustrating a method of obtaining data on brightness around an electronic device, according to an embodiment of the disclosure. This method may be performed by the electronic device 101 illustrated in FIG. 1, the electronic device 101 illustrated in FIG. 2, the processor 120 illustrated in FIG. 1, or the second processor 220 illustrated in FIG. 2.

Referring to FIG. 8, in operation 810, while displaying a screen through a display 240 controlled by a first processor 210, a second processor 220 may obtain the first illuminance data through first pixels of an image sensor 250 disposed under first pixels of a display 240 among a plurality of pixels of an image sensor 250, and obtain second illuminance data through second pixels of an image sensor 250 disposed under wires for surrounding first pixels of an image sensor 250 and driving first pixels of a display 240. For example, the first pixels of the image sensor 250 may be pixels of the image sensor 250 located within an area including the first pixels of the display 240 when viewed from above, among the plurality of pixels of the image sensor 250. For example, the second pixels of the image sensor 250 may be pixels of the image sensor 250 located along the edge of the area including the first pixels of the display 240 when viewed from above, among the plurality of pixels of the image sensor 250. For example, the first pixels of the display 240 may include a first pixel 410-1 and a second pixel 410-2 of the display 240 illustrated in FIG. 4, the first pixels of the image sensor 250 include pixels in the area 710 illustrated in FIG. 7, and the second pixels of the image sensor 250 may include pixels within a sixth sub-virtual area 610-6 in the first group, an eighth sub-virtual area 610-8 in the first group, a fourth sub-virtual area 620-4 in the second group, an eighth sub-virtual area 620-8 in the second group, and a second sub-virtual area 630-2 in the third group, a sixth sub-virtual area 630-6, a second sub-virtual area 640-2 in the fourth group, and a fourth sub-virtual area 640-4 in the fourth group illustrated in FIG. 7. However, it is not limited thereto.

For example, the first illuminance data may include the first illuminance values obtained through the first pixels of the image sensor 250 or may represent the first illuminance values obtained through the first pixels of the image sensor 250, wherein the second illuminance data may include the second illuminance values obtained through the second pixels of the image sensor 250 or may represent the second illuminance values obtained through the second pixels of the image sensor 250. However, it is not limited thereto.

In an embodiment, the second processor 220 may obtain the first illuminance data and the second illuminance data while the first processor 210 and/or the third processor 230 do not obtain an image through the image sensor 250. For example, the first illuminance data and the second illuminance data may be obtained while the image sensor 250 is not used to obtain an image. For example, the first illuminance data and the second illuminance data may not be obtained while the image sensor 250 is used to obtain an image. However, it is not limited thereto.

In operation 820, the second processor 220 may obtain data on brightness around the electronic device 101 based on the first illuminance data and the second illuminance data. For example, the unit of the data with respect to the brightness may be lux.

In an embodiment, the second processor 220 may obtain the data for the brightness based on a difference between the first illumination data and the second illumination data. In an embodiment, the second processor 220 may obtain the data on the brightness further based on the reference data defined through the description of FIGS. 2 to 7. In an embodiment, the second processor 220 may obtain the data on the brightness further based on a degree to which light from the outside passes through the display 240. In an embodiment, the second processor 220 may obtain the data on the brightness further based on the dark count of the image sensor 250.

As described above, the electronic device 101 may identify the brightness by using the image sensor 250 used to obtain an image without a separate sensor (e.g., an illumination sensor) for identifying the brightness around the electronic device 101. Since the image sensor 250 receives light emitted from the display 240 as well as light outside the electronic device 101 providing the brightness around the electronic device 101 by being disposed under display 240, the electronic device 101 may identify the brightness based on a relative positional relationship between the pixels of the display 240 and the pixels of the image sensor 250. The electronic device 101 may obtain the data for the brightness in which the influence from light emitted from the display 240 is reduced, based on the identification.

Figure 9:
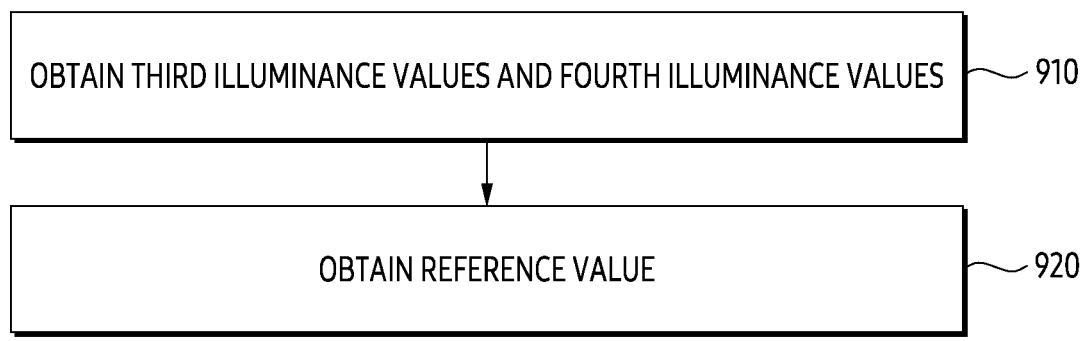
FIG. 9 is a flowchart illustrating a method of obtaining a reference value, according to an embodiment of the disclosure.

FIG. 9 is a flowchart illustrating a method of obtaining a reference value, according to an embodiment of the disclosure. This method may be performed by the electronic device 101 illustrated in FIG. 1, an electronic device 101 illustrated in FIG. 2, a processor 120 illustrated in FIG. 1, or a second processor 220 illustrated in FIG. 2.

Referring to FIG. 9, in operation 910, while displaying a white image through the display 240 in a state in which the periphery of the electronic device 101 is black, the second processor 220 may obtain the third illuminance values through the first pixels of the image sensor 250 defined through the description of FIG. 8, and may obtain the fourth illuminance values through the second pixels of the image sensor 250 defined through the description of FIG. 8. For example, data including the third illuminance values may be referred to as the third illuminance data, and data including the fourth illuminance values may be referred to as the fourth illuminance data.

In an embodiment, the second processor 220 may execute operation 910 when the display of the electronic device 101 is replaced with the display 240 from the existing display or the image sensor of the electronic device 101 is replaced with the image sensor 250 from the existing image sensor. In an embodiment, the second processor 220 may execute operation 910 before the electronic device 101 is supplied to the user after the assembly of the electronic device 101 is completed. In an embodiment, when an external impact greater than or equal to a reference size is applied to the electronic device 101, the second processor 220 may execute operation 910. However, it is not limited thereto.

In operation 920, the second processor 220 may obtain a reference value based on the third illuminance values and the fourth illuminance values. In an embodiment, the second processor 220 may identify an average of the third illuminance values and an average of the fourth illuminance values, and may identify a difference value between the average of the third illuminance values and the average of the fourth illuminance values as the reference value. For example, since the reference value is identified based on the illumination values obtained while displaying the white image through display 240 in a state in which the periphery of the electronic device 101 is black, the reference value may reduce that an influence by light emission of the display 240 is applied to the data on the brightness obtained through operation 820 illustrated in FIG. 8. For example, the reference value may be $C_{Dark}$ of Equation 1.

Figure 10:
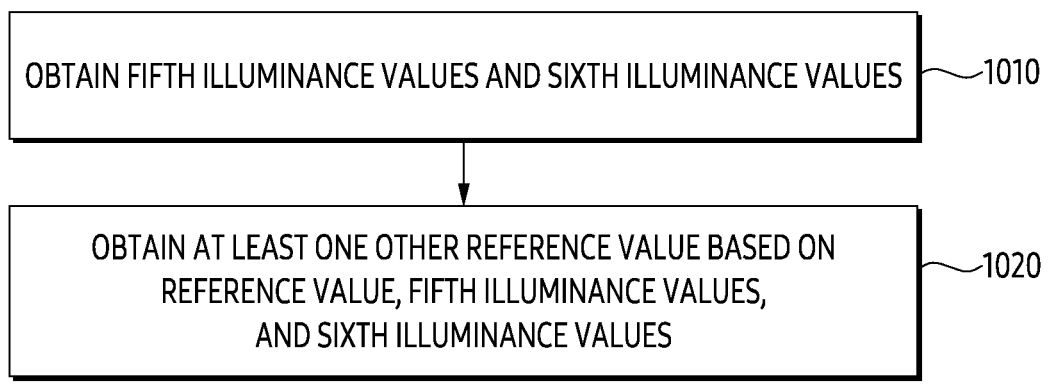
FIG. 10 is a flowchart illustrating a method of obtaining at least one different reference value according to an embodiment of the disclosure.

FIG. 10 is a flowchart illustrating a method of obtaining at least one different reference value according to an embodiment of the disclosure. This method may be performed by the electronic device 101 illustrated in FIG. 1, the electronic device 101 illustrated in FIG. 2, the processor 120 illustrated in FIG. 1, or the second processor 220 illustrated in FIG. 2.

Referring to FIG. 10, in operation 1010, while displaying a white image through a display 240 in a state in which the brightness around an electronic device 101 is a specified brightness (e.g., 20 lux), a second processor 220 may obtain the fifth illuminance values through first pixels of an image sensor 250 defined through the description of FIG. 8, and may obtain the sixth illuminance values through second pixels of an image sensor 250 defined through the description of FIG. 8. For example, data including the fifth illuminance values may be referred to as the fifth illuminance data, and data including the sixth illuminance values may be referred to as the sixth illuminance data. For example, operation 1010 may be executed after executing operation 920.

In operation 1020, the second processor 220 may obtain at least one other reference value different from the reference value based on the reference value, the fifth illuminance values, and the sixth illuminance values obtained based on the execution of operation 920 illustrated in FIG. 9. In an embodiment, when the second processor 220 obtains the data on the brightness according to operation 820 by using Equation 1, the second processor 220 may obtain $C_{Gain}$ and $C_B$ of Equation 1, which are different from the reference value that is $C_{Dark}$ of Equation 1, as at least one other reference value. For example, since Lux of Equation 1 is the predetermined brightness and $C_{Dark}$ of Equation 1 is the reference value obtained through operation 920, the second processor 220 may obtain at least one other reference value that is $C_{Gain}$ and $C_B$ of Equation 1, by applying a difference value between the average of the fifth illuminance values and the average of the sixth illuminance values in Equation 1 to $X_{amb}$. However, it is not limited thereto.

Figure 11:
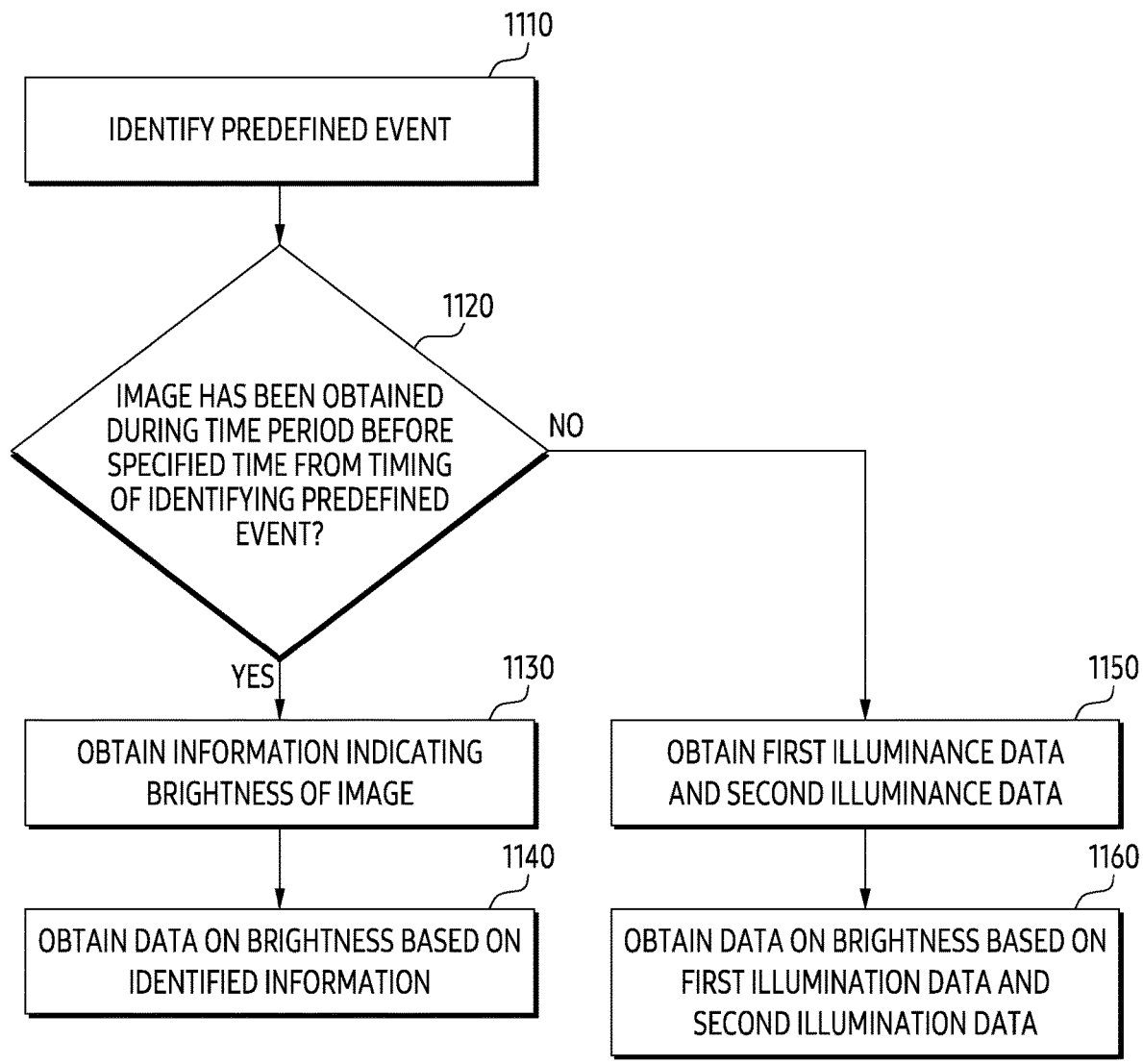
FIG. 11 is a flowchart illustrating a method of adaptively obtaining data on brightness around an electronic device based on whether an image has been obtained according to an embodiment of the disclosure.

FIG. 11 is a flowchart illustrating a method of adaptively obtaining data on brightness around an electronic device based on whether an image has been obtained according to an embodiment of the disclosure. This method may be performed by the electronic device 101 illustrated in FIG. 1, the electronic device 101 illustrated in FIG. 2, the processor 120 illustrated in FIG. 1, or the second processor 220 illustrated in FIG. 2.

Referring to FIG. 11, in operation 1110, a second processor 220 may identify a predefined event. For example, the predefined event may be an event for requesting data on brightness around the electronic device 101. For example, the predefined event may be activation of a function of adaptively changing the brightness of the display 240 depending on the brightness around the electronic device 101. For another example, the predefined event may be that a predetermined timing arrives according to a cycle of obtaining the data for the brightness within the state in which the function is activated. However, it is not limited thereto. Meanwhile, according to embodiments, operation 1110 may be executed by the first processor 210.

In operation 1120, in response to the identification, the second processor 220 may identify whether an image has been obtained through the image sensor 250 during a time period before a specified time from the timing of identifying the predefined event. For example, as the second processor 220 requests the first processor 210 to transmit a signal indicating whether the image has been obtained during the time period and the first processor 210 transmits the signal, the identification in operation 1120 may be executed. For another example, as the first processor 210 or the third processor 230 transmit data on the timing of obtaining the image to the second processor 220 whenever the image is obtained through the image sensor 250 and the second processor 220 inquires the data in response to the identification in operation 1110, the identification in operation 1120 may be executed. However, it is not limited thereto.

Meanwhile, the second processor 220 may execute operation 1130 on a condition that the image is obtained during the time period, and the second processor 220 may execute operation 1150 on a condition that the image is not obtained during the time period.

In operation 1130, the second processor 220 may obtain information indicating the brightness of the image based on identifying that the image has been obtained during the time period. For example, when the image is encoded based on a luma (Y), blue projection (U), and red projection (V) (YUV) attribute, a YUV format, or a YUV model, the second processor 220 may obtain data on a luma as the information. For example, the second processor 220 may obtain the information by receiving the information from the first processor 210 or the third processor 230.

Meanwhile, according to embodiments, operation 1130 may be executed by the first processor 210 or the third processor 230.

In operation 1140, the second processor 220 may obtain the data on the brightness around the electronic device 101 based on the information. For example, the second processor 220 may obtain the data on the brightness based on the image obtained during the time period through the image sensor 250 without executing operations 810 to 820.

In operation 1150, the second processor 220 may obtain the first illuminance data and the second illuminance data based on identifying that no image has been obtained through the image sensor 250 during the time period. For example, operation 1150 may correspond to operation 810 illustrated in FIG. 8.

In operation 1160, the second processor 220 may obtain the data on the brightness based on the first illumination data and the second illumination data. For example, operation 1160 may correspond to operation 820 illustrated in FIG. 8.

As described above, the electronic device 101 may identify the brightness around the electronic device 101 by using the obtained image on a condition that an image capable of estimating the brightness around the electronic device 101 has been obtained, and identify the brightness around the electronic device 101 based on illumination data obtained through the image sensor 250 on a condition that the image is not obtained. The electronic device 101 may enhance the efficiency of resource consumption for identifying the brightness by adaptively selecting an operation for identifying the brightness around the electronic device 101.

Figure 12:
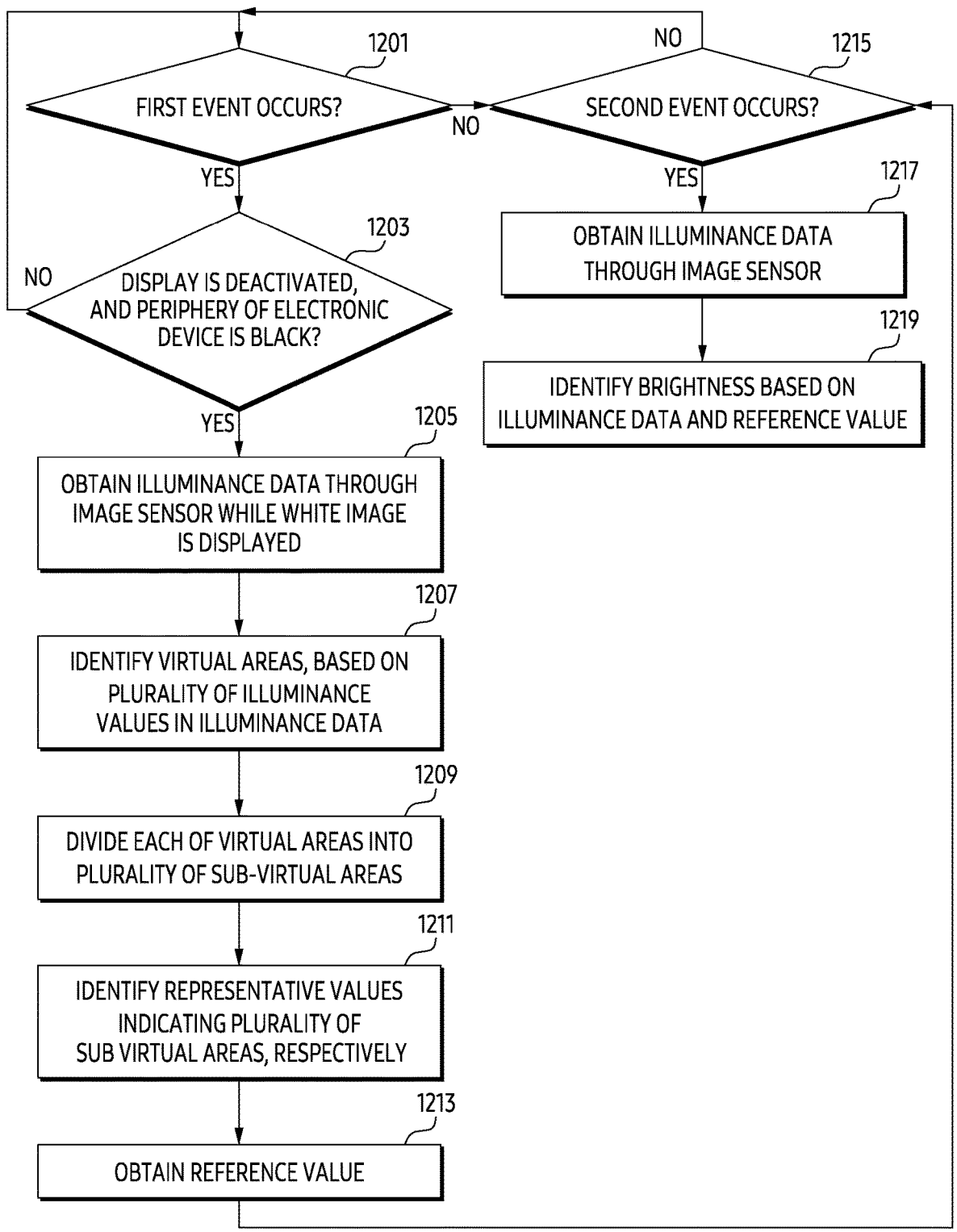
FIG. 12 is a flowchart illustrating a method of obtaining data on brightness around an electronic device after obtaining a reference value according to an embodiment of the disclosure.

FIG. 12 is a flowchart illustrating a method of obtaining data on brightness around an electronic device after obtaining a reference value according to an embodiment of the disclosure. This method may be performed by the electronic device 101 illustrated in FIG. 1, the electronic device 101 illustrated in FIG. 2, the processor 120 illustrated in FIG. 1, or the second processor 220 illustrated in FIG. 2.

Referring to FIG. 12, in operation 1201, a second processor 220 may identify whether a first event occurs. In an embodiment, the first event may include replacement of the display 240. For example, the second processor 220 may identify whether the first event occurs by identifying whether the identification information of the display 240 is changed. For example, the second processor 220 may identify whether the first event occurs by identifying whether an input or a signal indicating replacement of the display 240 is obtained. In an embodiment, the first event may include replacement of the image sensor 250. For example, the second processor 220 may identify whether the first event occurs by identifying whether the identification information of the image sensor 250 is changed. For example, the second processor 220 may identify whether the first event occurs by identifying whether an input or a signal indicating replacement of the image sensor 250 is obtained. In an embodiment, the first event may include obtaining an input or a signal for requesting calibration of the data on brightness around the electronic device 101 identified through the image sensor 250. For example, the second processor 220 may identify whether the first event occurs by identifying whether the input or the signal for requesting the calibration is obtained. For example, the input or the signal may be caused by a predefined user input. However, it is not limited thereto.

The second processor 220 may execute operation 1203 on a condition that the first event occurs, otherwise execute operation 1215.

In operation 1203, the second processor 220 may identify whether the display 240 is deactivated and the periphery of the electronic device 101 is black, based on identifying that the first event occurs. For example, in order to identify whether the electronic device 101 is in a state for obtaining the reference value in operation 1213, the second processor 220 may identify whether the display 240 is deactivated and the periphery of the electronic device 101 is black. In an embodiment, the operation of identifying whether the periphery of the electronic device 101 is black may be executed, by receiving a signal indicating that the periphery of the electronic device 101 is black from an external electronic device or an input indicating that the periphery of the electronic device 101 black. In an embodiment, the operation of identifying whether the periphery of the electronic device 101 is black may be executed, by obtaining illumination data through the image sensor 250, and obtaining the data on the brightness around the electronic device 101 based on the illuminance data and the reference value stored in the non-volatile memory (e.g., the non-volatile memory 134 illustrated in FIG. 1) of the electronic device 101 when executing operation 1203. However, it is not limited thereto.

The second processor 220 may execute operation 1205 on a condition that the display 240 is deactivated and the periphery of the electronic device 101 is black, otherwise execute operation 1201 again.

In operation 1205, the second processor 220 may obtain illuminance data through the image sensor 250 while the white image is displayed through the display 240, based on identifying that the display 240 is deactivated and the periphery of the electronic device 101 is black. For example, the illuminance data obtained in operation 1205 may be the illuminance data 600 illustrated in FIG. 6.

In operation 1207, the second processor 220 may identify virtual areas based on a plurality of illuminance values in the illuminance data obtained in operation 1205. For example, the virtual areas may be a first virtual area 610, a second virtual area 620, a third virtual area 630, and a fourth virtual area 640 illustrated through FIG. 6 and descriptions thereof.

In operation 1209, the second processor 220 may divide each of the virtual areas into a plurality of sub-virtual areas. For example, the plurality of virtual areas may include a first sub-virtual area 610-1 to a ninth sub-virtual area 610-9 in the first group, a first sub-virtual area 620-1 to a ninth sub-virtual area 620-9 in the second group, a first sub-virtual area 630-1 to a ninth sub-virtual area 630-9 in the third group, and a first sub-virtual area 640-1 to a ninth sub-virtual areas 640-9 in the fourth group illustrated through in FIG. 6 and description thereof.

In operation 1211, the second processor 220 may identify representative values indicating the plurality of sub virtual areas, respectively. For example, the representative values may include representative values ($b_1$ to $b_9$) representing the first sub-virtual area 610-1 to the ninth sub-virtual area 610-9 in the first group, and representative values ($c_1$ to $c_9$) representing the first sub-virtual area 620-1 to the ninth sub-virtual area 620-9 in the second group, representative values ($d_1$ to $d_9$) representing the first sub-virtual area 630-1 to the ninth sub-virtual area 630-9 in the third group, and representative values ($e_1$ to $e_9$) representing the first sub-virtual area 640-1 to ninth sub-virtual area 640-9 in the fourth group illustrated through in FIG. 6 and description thereof, respectively.

In operation 1213, the second processor 220 may obtain a reference value based on the representative values. For example, the second processor 220 may classify the representative values according to the method defined through the description of FIG. 6. The second processor 220 may identify the first pixels of the image sensor 250 and the second pixels of the image sensor 250 defined through the description of FIG. 6 based on the classification. The second processor 220 may obtain the reference value (e.g., $C_{Dark}$ of Equation 1) based on a difference between the third illuminance data (e.g., third illuminance values defined through the description of FIG. 9) obtained through the first pixels of the image sensor 250 and the fourth illuminance data (e.g., the fourth illuminance values defined through the description of FIG. 9) obtained through the second pixels of the image sensor 250. The second processor 220 may store the obtained reference value in the non-volatile memory.

In operation 1215, the second processor 220 may identify whether a second event occurs, based on identifying that the first event does not occur, and identify whether the second event occurs while storing the reference value in the non-volatile memory. For example, the second event may mean receiving a request to obtain data on brightness around the electronic device 101.

The second processor 220 may execute operation 1217 on a condition that the second event occurs, and otherwise execute operation 1201 again.

In operation 1217, the second processor 220 may obtain illuminance data through the image sensor 250 based on identifying that the second event occurs. For example, the second processor 220 may obtain the illuminance data in operation 1217, in order to identify the brightness around the electronic device 101.

In operation 1219, the second processor 220 may identify brightness around the electronic device 101 based on the illuminance data obtained in operation 1217 and the reference value. For example, the reference value is data stored in the nonvolatile memory and may be obtained through operation 1213.

As described above, the electronic device 101 may identify brightness around the electronic device 101 through the image sensor 250 by identifying occurrences of the first event and the second event. In an embodiment, an operation (e.g., operation 1201) of identifying whether the first event occurs and/or an operation (e.g., operation 1215) of identifying whether the second event occurs may be executed based on satisfying predefined conditions. For example, the operation of identifying whether the first event occurs and/or the operation of identifying whether the second event occurs may be executed according to a predefined period. For example, the operation of identifying whether the first event occurs and/or the operation of identifying whether the second event occurs may be executed according to a predefined input. However, it is not limited thereto.

Figure 13:
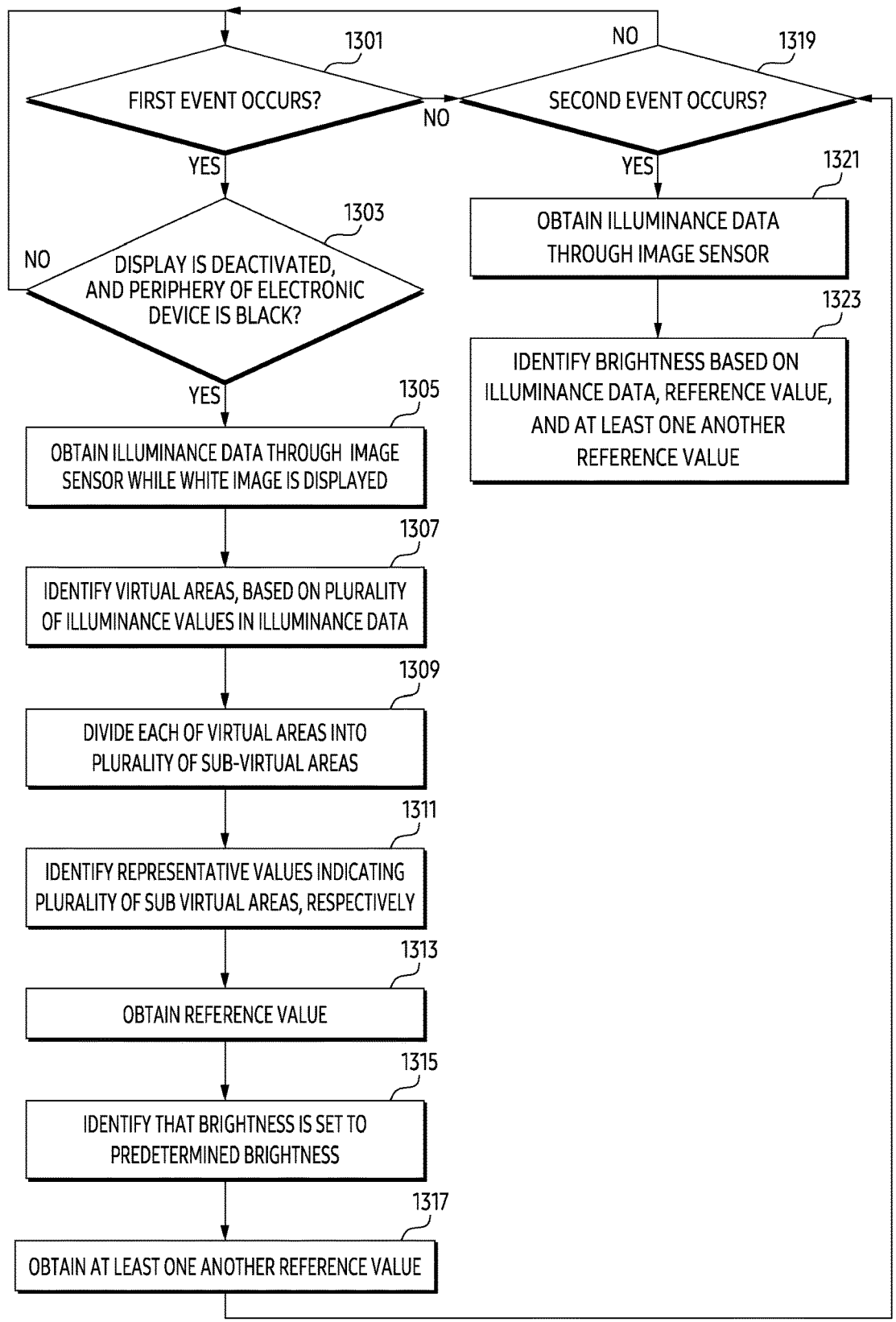
FIG. 13 is a flowchart illustrating a method of obtaining data on brightness around an electronic device after obtaining a reference value and at least one other reference value according to an embodiment of the disclosure.

FIG. 13 is a flowchart illustrating a method of obtaining data on brightness around an electronic device after obtaining a reference value and at least one other reference value according to an embodiment of the disclosure. This method may be performed by the electronic device 101 illustrated in FIG. 1, the electronic device 101 illustrated in FIG. 2, the processor 120 illustrated in FIG. 1, or the second processor 220 illustrated in FIG. 2.

Referring to FIG. 13, in operation 1301, a second processor 220 may identify whether a first event occurs. In an embodiment, the first event may include replacement of the display 240. For example, the second processor 220 may identify whether the first event occurs by identifying whether the identification information of the display 240 is changed. For example, the second processor 220 may identify whether the first event occurs by identifying whether an input or a signal indicating replacement of the display 240 is obtained. In an embodiment, the first event may include replacement of the image sensor 250. For example, the second processor 220 may identify whether the first event occurs by identifying whether the identification information of the image sensor 250 is changed. For example, the second processor 220 may identify whether the first event occurs by identifying whether an input or a signal indicating replacement of the image sensor 250 is obtained. However, it is not limited thereto.

The second processor 220 may execute operation 1303 on a condition that the first event occurs, otherwise execute operation 1319.

In operation 1303, the second processor 220 may identify whether the display 240 is deactivated and the periphery of the electronic device 101 is black based on identifying that the first event occurs. For example, in order to identify whether the electronic device 101 is within a state for obtaining the reference value in operation 1313, the second processor 220 may identify whether the display 240 is deactivated and the periphery of the electronic device 101 is black. For example, operation 1303 may correspond to operation 1203 illustrated in FIG. 12.

The second processor 220 may execute operation 1305 under the condition that the display 240 is deactivated and the periphery of the electronic device 101 is black, otherwise execute operation 1301 again.

In operation 1305, the second processor 220 may obtain illuminance data through the image sensor 250 while the white image is displayed through the display 240 based on identifying that the display 240 is deactivated and that the periphery of the electronic device 101 is black. For example, the illuminance data obtained in operation 1305 may be the illuminance data 600 illustrated in FIG. 6.

In operation 1307, the second processor 220 may identify virtual areas based on a plurality of illuminance values in the illuminance data obtained in operation 1305. For example, the virtual areas may be a first virtual area 610, a second virtual area 620, a third virtual area 630, and a fourth virtual area 640 illustrated through FIG. 6 and descriptions thereof.

In operation 1309, the second processor 220 may divide each of the virtual areas into a plurality of sub-virtual areas. For example, the plurality of virtual areas may include a first sub-virtual area 610-1 to a ninth sub-virtual area 610-9 in the first group, a first sub-virtual area 620-1 to a ninth sub-virtual area 620-9 in the second group, a first sub-virtual area 630-1 to a ninth sub-virtual area 630-9 in the third group and a first sub-virtual area 640-1 to a ninth sub-virtual area 640-9 in the fourth group illustrated in FIG. 6 and description thereof.

In operation 1311, the second processor 220 may identify representative values representing each of the plurality of sub-virtual areas. For example, the representative values may include representative values ($b_1$ to $b_9$) representing the first sub-virtual area 610-1 to the ninth sub-virtual area 610-9 in the first group, representative values ($c_1$ to $c_9$) representing the first sub-virtual areas 620-1 to the ninth sub-virtual areas 620-9 in the second group, representative values ($d_1$ to $d_9$) representing the first sub-virtual area 630-1 to the ninth sub-virtual area 630-9 in the third group, and representative values ($e_1$ to $e_9$) representing the first sub-virtual area 640-1 to the ninth sub-virtual area 640-9 in the fourth group illustrated in FIG. 6 and description thereof, respectively.

In operation 1313, the second processor 220 may obtain a reference value based on the representative values. For example, the second processor 220 may classify the representative values according to the method defined through the description of FIG. 6. The second processor 220 may identify the first pixels of the image sensor 250 and the second pixels of the image sensor 250 defined through the description of FIG. 6 based on the classification. The second processor 220 may obtain the reference value (e.g., $C_{Dark}$ of Equation 1) based on the difference between the third illuminance data (e.g., the third illuminance values defined through the description of FIG. 9) obtained through the first pixels of the image sensor 250 and the fourth illuminance data (e.g., the fourth illuminance values defined through the description of FIG. 9) obtained through the second pixels of the image sensor 250. The second processor 220 may store the obtained reference value in the non-volatile memory.

In operation 1315, after obtaining or storing the reference value, the second processor 220 may identify that the brightness around the electronic device 101 is set to a predetermined brightness. In an embodiment, the second processor 220 may identify that the brightness around the electronic device 101 is set to the predetermined brightness by receiving a signal indicating that the brightness around the electronic device 101 is set to the predetermined brightness from the external electronic device, or receiving a user input indicating that the brightness around the electronic device 101 is set with the predetermined brightness. However, it is not limited thereto. The second processor 220 may obtain another illuminance data different from the illuminance data obtained in operation 1305, through the image sensor 250, based on the identification.

In operation 1317, the second processor 220 may obtain at least one other reference value within a state in which brightness around the electronic device 101 is set to the predetermined brightness. For example, when at least one other reference value is obtained according to Equation 1, the second processor 220 may obtain $X_{amb}$ (e.g., illuminance data obtained through operation 1305) of Equation 1 and $C_{Dark}$ of Equation 1, through operations 1305 to 1313, while the Lux of Equation 1 is 0. The second processor 220 may obtain $X_{amb}$ of Equation 1 through operation 1315, while the Lux of Equation 1 is the predetermined brightness. The second processor 220 may obtain $C_{Gain}$ and $C_B$ of Equation 1 as the at least one other reference value by using $X_{amb}$ of Equation 1 obtained through operations 1305 to 1313, $X_{amb}$ obtained through operation 1315, and $C_{Dark}$ of Equation 1 obtained through operation 1313. The at least one other reference value may be stored in the non-volatile memory.

In operation 1319, the second processor 220 may identify whether the second event occurs based on identifying that the first event does not occur and identify whether the second event occurs while storing the reference value in the non-volatile memory. For example, the second event may mean receiving a request to obtain data on brightness around the electronic device 101.

The second processor 220 may execute operation 1321 on a condition that the second event occurs, otherwise execute operation 1301 again.

In operation 1321, the second processor 220 may obtain illuminance data through the image sensor 250 based on identifying that the second event occurs. For example, the second processor 220 may obtain the illuminance data in operation 1321 in order to identify the brightness around the electronic device 101.

In operation 1323, the second processor 220 may identify brightness around the electronic device 101 based on the illuminance data obtained in operation 1321, the reference value, and the at least one other reference value.

As described above, the electronic device 101 may identify brightness around the electronic device 101 through the image sensor 250 by identifying occurrences of the first event and the second event. In an embodiment, an operation (e.g., operation 1201) of identifying whether the first event occurs and/or an operation (e.g., operation 1215) of identifying whether the second event occurs may be executed based on satisfying predefined conditions. For example, an operation of identifying whether the first event occurs and/or an operation of identifying whether the second event occurs may be executed according to a predefined period. For example, an operation of identifying whether the first event occurs and/or an operation of identifying whether the second event occurs may be executed according to a predefined input. However, it is not limited thereto.

The electronic device according to an embodiment can obtain data on brightness around the electronic device by processing data obtained through the image sensor disposed under the display to reduce an influence of light emission of the display.

As described above, an electronic device (e.g., electronic device 101) may comprise a window (e.g., window 400); a display (e.g., display 240), disposed under the window, comprising a plurality of pixels (e.g., a plurality of pixels 410), the plurality of pixels comprising first pixels (e.g., the first pixel 410-1 and the second pixel 410-2); an image sensor (e.g., image sensor 250) disposed under the display; a first processor (e.g., first processor 210) connected through a first electric path (e.g., first electrical path 255) to the image sensor; and a second processor (e.g., second processor 220) connected through a second electric path (e.g., second electrical path 260) different from the first electric path to the image sensor, wherein the second processor may be configured to, while displaying a screen through the display controlled by the first processor, obtain first illuminance data via a first pixels (e.g., pixels 545 of the image sensor 250) of the image sensor disposed under the first pixels of the display among a plurality of pixels (e.g., a plurality of pixels 420) of the image sensor; and obtain second illuminance data via a second pixels (e.g., pixels 580 of the image sensor 250 and pixels 590 of the image sensor 250) of the image sensor disposed under wires for driving the first pixels of the display among the plurality of pixels of the image sensor, the second pixels of the image sensor surrounding the first pixels of the image sensor, and obtain data regarding brightness around the electronic device, based on the first illuminance data and the second illuminance data.

In an embodiment, the second processor may be configured to obtain the data regarding the brightness, based on a difference between the first illuminance data and the second illuminance data.

In an embodiment, the second processor may be configured to obtain the data regarding the brightness, based on reference data indicating difference between third illuminance data and fourth illuminance data, the first illuminance data, and the second illuminance data, while displaying a white image through the display, in a state in which a periphery of the electronic device is black, wherein the third illuminance data may be obtained via the first pixels of the image sensor, and wherein the fourth illuminance data may be obtained via the second pixels of the image sensor. In an embodiment, the data regarding the brightness may be obtained further based on degree to which external light passes through the display. In an embodiment, the data regarding the brightness may be obtained further based on a dark count of the image sensor.

In an embodiment, the second processor may be configured to obtain the first illuminance data and the second illuminance data, while the first processor is in a second state among a first state that obtains an image based on data obtained from the image sensor and the second state distinct from the first state.

In an embodiment, the second processor may be configured to provide the data regarding the brightness to the first processor, and wherein the first processor may be configured to change brightness of the screen based on the data regarding the brightness.

In an embodiment, an amount of time by which first light generated by the display of the screen arrives at the first pixels of the image sensor after the first light is reflected by the window may be less than an amount of time by which the first light arrives at the second pixels of the image sensor after the first light is reflected by the window.

As described above, an electronic device (e.g., electronic device 101) may comprise a window (e.g., window 400); a display (e.g., display 240), disposed under the window, comprising a plurality of pixels (e.g., a plurality of pixels 410), the plurality of pixels comprising first pixels (e.g., the first pixel 410-1 and the second pixel 410-2); an image sensor (e.g., image sensor 250) disposed under the display; a first processor (e.g., first processor 210) connected through a first electric path (e.g., first electrical path 255) to the image sensor; and a second processor (e.g., second processor 220) connected through a second electric path (e.g., second electrical path 260) different from the first electric path to the image sensor, wherein the second processor may be configured to, while the first processor is in a second state (e.g., a state in which an image is not obtained based on data obtained through the image sensor) among a first state obtaining an image based on data obtained via the image sensor and the second state distinct from the first state, obtain first illuminance values via first pixels of the image sensor located in an area comprising the first pixels (e.g., pixels 545 of the image sensor 250 of the display when viewed from above, among a plurality of pixels e.g., a plurality of pixels 420) of the image sensor; and obtain second illuminance values via second pixels (e.g., pixels 580 of the image sensor 250 and pixels 590 of the image sensor 250 of the image sensor located along a periphery of the area when viewed from above, among the plurality of pixels of the image sensor), and obtain data regarding brightness around the electronic device, based on the first illuminance values and the second illuminance values.

In an embodiment, the second processor may be configured to obtain the data regarding the brightness, based on a difference value between an average value of the first illuminance values and an average value of the second illuminance values. In an embodiment, the second processor may be configured to store, as a reference value, a difference value between third illuminance values obtained via the first pixels of the image sensor and fourth illuminance values obtained via the second pixels of the image sensor while displaying a white image through the display in a state in which a periphery of the electronic device is black; and obtain the data regarding the brightness further based on the reference value. In an embodiment, the second processor may be configured to obtain the data regarding the brightness further based on degree to which external light passes through the display. In an embodiment, the second processor may be configured to obtain the data regarding the brightness further based on a dark count of the image sensor.

In an embodiment, the second processor may be configured to obtain the first illuminance values and the second illuminance values while the first processor is in the second state and a screen is displayed through the display. In an embodiment, the second processor may be configured to obtain the first illuminance values and the second illuminance values while a software application that obtains an image via the image sensor is not executed.

In an embodiment, the second processor may be configured to provide the data regarding the brightness to the first processor, and wherein the first processor may be configured to change brightness of the screen based on the data regarding the brightness.

As described above, an electronic device (e.g., electronic device 101) may comprise a window (e.g., window 400); a display (e.g., display 240), disposed under the window, comprising a plurality of pixels (e.g., a plurality of pixels 410), the plurality of pixels comprising first pixels (e.g., the first pixel 410-1 and the second pixel 410-2); an image sensor (e.g., image sensor 250) disposed under the display; and at least one processor (e.g., first processor 210, second processor 220, and/or third processor 230), wherein the at least one processor may be configured to, while display a white image through the display in a state in which a periphery of the electronic device is black, obtain first illuminance values via first pixels (e.g., pixels 545 of the image sensor 250) of the image sensor included in a specified area comprising the first pixels of the display when viewed from above; and obtain second illuminance values via second pixels (e.g., pixels 580 of the image sensor 250 and pixels 590 of the image sensor 250) of the image sensor surrounding the specified area, wherein the second pixels of the image sensor overlaps at least portion of wires for operating the first pixels of the display when viewed from above, and obtain a reference value used for identifying brightness around the electronic device based on the first illuminance values and the second illuminance values.

In an embodiment, the at least one processor may be configured to obtain a difference value between an average value of the first illuminance values and an average value of the second illuminance values.

In an embodiment, the at least one processor may be configured to, while displaying a white image through the display in a state in which an illuminance around the electronic device is a specified illuminance, obtain third illuminance values via the first pixels of the image sensor; and obtain fourth illuminance values via the second pixels of the image sensor, and obtain at least another reference value used for identifying the brightness around the electronic device based on the reference value, the third illuminance values, and the fourth illuminance values.

In an embodiment, the first pixels of the image sensor and the second pixels of the image sensor may be identified based on a distribution of light that arrives at the image sensor while displaying a white image in the state in which the periphery of the electronic device is black.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   a window;
   a display, disposed under the window or beneath the window;
   an image sensor disposed under a display area of the display;
   at least one processor comprising processing circuitry; and
   memory, comprising one or more storage media, storing instructions, when executed by the at least one processor, which cause the electronic device to:
      while displaying a screen through the display area:
         obtain first illuminance data via first pixels of the image sensor disposed under first pixels of the display positioned in the display area,
         obtain second illuminance data via second pixels of the image sensor disposed under one or more wires for driving the first pixels of the display, the second pixels of the image sensor surrounding the first pixels of the image sensor, and
         identify brightness of outside of the electronic device, based on the first illuminance data and the second illuminance data.

2. The electronic device of claim 1, wherein the instructions, when executed by the at least one processor, further cause the electronic device to:
   identify the brightness of the outside of the electronic device, based on a difference between the first illuminance data and the second illuminance data.

3. The electronic device of claim 1,
   wherein the instructions, when executed by the at least one processor, further cause the electronic device to:
      identify the brightness of the outside of the electronic device, based on reference data indicating difference between third illuminance data and fourth illuminance data, the first illuminance data, and the second illuminance data,
   wherein the third illuminance data is obtained via the first pixels of the image sensor in a state in which a periphery of the electronic device is black, and
   wherein the fourth illuminance data is obtained via the second pixels of the image sensor in the state in which the periphery of the electronic device is black.

4. The electronic device of claim 3, wherein the brightness of the outside of the electronic device is identified further based on a degree to which external light passes through the display.

5. The electronic device of claim 4, wherein the brightness of the outside of the electronic device is identified further based on a dark count of the image sensor.

6. The electronic device of claim 1, wherein the instructions, when executed by the at least one processor, further cause the electronic device to;
   obtain the first illuminance data and the second illuminance data, while a first processor is in a second state among a first state that obtains an image based on data obtained from the image sensor and the second state distinct from the first state.

7. The electronic device of claim 1,
   wherein the instructions, when executed by the at least one processor, further cause the electronic device to:
   change brightness of the screen based on the brightness of the outside of the electronic device.

8. The electronic device of claim 1, wherein an amount by which first light generated by the display of the screen arrives at the first pixels of the image sensor after the first light is reflected by the window is less than an amount by which the first light arrives at the second pixels of the image sensor after the first light is reflected by the window.

9. A non-transitory computer readable storage medium storing one or more programs including instructions that, when executed by at least one processor of an electronic device, comprising a window, a display disposed under the window or beneath the window, and an image sensor disposed under a display area of the display, individually or collectively, cause the electronic device to:
   identify an event for obtaining data regarding brightness of outside of the electronic device,
   based on the event being identified while the image sensor is used for photographing, obtain the data regarding the brightness of the outside of the electronic device using an image obtained via the image sensor for photographing, and
   based on the event being identified while the image sensor is not used for photographing:
      obtain first illuminance values via first pixels of the image sensor overlapping first pixels of the display positioned in the display area, obtain second illuminance values via second pixels of the image sensor overlapping at least a portion of wires for driving the first pixels of the image sensor, and obtain the data regarding the brightness of the outside of the electronic device, based on the first illuminance values and the second illuminance values.

10. The non-transitory computer readable storage medium of claim 9, wherein the one or more programs include further instructions that, when executed by the at least one processor of the electronic device individually or collectively, cause the electronic device to:

obtain the data regarding the brightness of the outside of the electronic device, based on a difference value between an average value of the first illuminance values and an average value of the second illuminance values.

11. The non-transitory computer readable storage medium of claim 10, wherein the one or more programs include further instructions that, when executed by the at least one processor of the electronic device individually or collectively, cause the electronic device to:

store, as a reference value, a difference value between third illuminance values obtained via the first pixels of the image sensor and fourth illuminance values obtained via the second pixels of the image sensor while displaying a white image through the display in a state in which a periphery of the electronic device is black, and obtain the data regarding the brightness of the outside of the electronic device further based on the reference value.

12. The non-transitory computer readable storage medium of claim 11, wherein the one or more programs include further instructions that, when executed by the at least one processor of the electronic device individually or collectively, cause the electronic device to:

obtain the data regarding the brightness of the outside of the electronic device further based on degree to which external light passes through the display.

13. The non-transitory computer readable storage medium of claim 12, wherein the one or more programs include further instructions that, when executed by the at least one processor of the electronic device individually or collectively, cause the electronic device to:

obtain the data regarding the brightness of the outside of the electronic device further based on a dark count of the image sensor.

14. The non-transitory computer readable storage medium of claim 9, wherein the one or more programs include further instructions that, when executed by the at least one processor of the electronic device individually or collectively, cause the electronic device to:

obtain the first illuminance values and the second illuminance values while the image sensor is not used for photographing and a screen is displayed through the display.

15. The non-transitory computer readable storage medium of claim 14, wherein the one or more programs include further instructions that, when executed by the at least one processor of the electronic device individually or collectively, cause the electronic device to:

obtain the first illuminance values and the second illuminance values while a software application that obtains an image via the image sensor is not executed.

16. The non-transitory computer readable storage medium of claim 9, wherein the one or more programs include further instructions that, when executed by the at least one processor of the electronic device individually or collectively, cause the electronic device to:

change brightness of a screen based on the data regarding the brightness of the outside of the electronic device.

17. An electronic device comprising:

a window;

a display, disposed under the window or beneath the window;

an image sensor disposed under a display area of the display;

at least one processor comprising processing circuitry; and memory, comprising one or more storage media, storing instructions, when executed by the at least one processor, which cause the electronic device to:

while displaying a white image through the display in a state in which a periphery space of the electronic device is black:

obtain first illuminance values via first pixels of the image sensor overlapping an area comprising the first pixels of the display, obtain second illuminance values via second pixels of the image sensor surrounding the first pixels of the image sensor, wherein the second pixels of the image sensor overlap at least a portion of wires for driving the first pixels of the display, and obtain a reference value to be used for identifying brightness of the outside of the electronic device, based on the first illuminance values and the second illuminance values.

18. The electronic device of claim 17, wherein the instructions, when executed by the at least one processor, further cause the electronic device to:

obtain a difference value between an average value of the first illuminance values and an average value of the second illuminance values.

19. The electronic device of claim 17, wherein the instructions, when executed by the at least one processor, further cause the electronic device to:

while displaying a white image through the display in a state in which an illuminance around the electronic device is a specified illuminance:

obtain third illuminance values via the first pixels of the image sensor, obtain fourth illuminance values via the second pixels of the image sensor, and obtain at least another reference value used for identifying the brightness around the electronic device based on the reference value, the third illuminance values, and the fourth illuminance values.

20. The electronic device of claim 17, wherein the first pixels of the image sensor and the second pixels of the image sensor are identified based on a distribution of light that arrives at the image sensor while displaying a white image in the state in which the periphery of the electronic device is black.

\* \* \* \* \*